US007908478B2

(12) United States Patent
Okamoto et al.

(10) Patent No.: US 7,908,478 B2
(45) Date of Patent: Mar. 15, 2011

(54) DATA PROCESSING METHOD AND DATA READING METHOD

(75) Inventors: Akiyoshi Okamoto, Osaka (JP); Masataka Ishida, Osaka (JP)

(73) Assignee: Yutaka Kawano, Osaka (JP)

( * ) Notice: Subject to any disclaimer, the term of this patent is extended or adjusted under 35 U.S.C. 154(b) by 1044 days.

(21) Appl. No.: 10/579,397

(22) PCT Filed: Sep. 13, 2004

(86) PCT No.: PCT/JP2004/013331

§ 371 (c)(1),
(2), (4) Date: May 15, 2006

(87) PCT Pub. No.: WO2005/088897

PCT Pub. Date: Sep. 22, 2005

(65) Prior Publication Data

US 2007/0136605 A1 Jun. 14, 2007

(30) Foreign Application Priority Data

Mar. 16, 2004 (WO) .................. PCT/JP2004/003504

(51) Int. Cl.
*H04L 29/06* (2006.01)
*H04L 9/32* (2006.01)
*G06F 21/00* (2006.01)
*H04N 7/167* (2006.01)

(52) U.S. Cl. ......... 713/167; 713/168; 713/171; 713/182; 380/201; 380/210; 380/218

(58) Field of Classification Search .................. 713/167, 713/171; 380/201, 210, 218
See application file for complete search history.

(56) References Cited

U.S. PATENT DOCUMENTS

| | | | | |
|---|---|---|---|---|
| 7,218,738 | B2 * | 5/2007 | Pedlow et al. | 380/218 |
| 7,228,423 | B2 * | 6/2007 | Asai et al. | 713/171 |
| 7,302,059 | B2 * | 11/2007 | Candelore et al. | 380/210 |
| 2004/0028227 | A1 * | 2/2004 | Yu | 380/201 |

FOREIGN PATENT DOCUMENTS

| | | |
|---|---|---|
| JP | 4-200125 | 7/1992 |
| JP | 5-316079 | 11/1993 |
| JP | 9-8797 | 1/1997 |
| JP | 2000-115162 | 4/2000 |
| JP | 2002-334172 | 11/2002 |

* cited by examiner

*Primary Examiner* — Shin-Hon Chen
(74) *Attorney, Agent, or Firm* — Michael A. Kerr; Kerr IP Group, LLC

(57) ABSTRACT

An object of the present invention is to prevent illegal use of data (digital contents), and a second object is to provide a method for processing data which ensures the collection of charges for secondary use of the data, a data reading method for reading the data processed by this processing method, and a recording medium storing programs implementing these methods.

The method for processing data is such that in a method for processing a data body b which is encrypted and is decrypted on a decryption bit length basis, and thereby is reproduced, the data body b is encrypted, a part of this data body b with a bit length different from the decryption bit length is omitted, and the omitted part is closed so as to make the data continuous.

20 Claims, 18 Drawing Sheets

(a)

(b)

DATA PROCESSING METHOD AND DATA READING METHOD

The present invention incorporates the contents of International Application No. PCT/JP2004/003504 filed on Mar. 16, 2004 and PCT/JP2004/013331 filed on Sep. 13, 2004, by reference under CFR 1.57 (b).

FIELD OF THE INVENTION

The present invention relates to a data processing method capable of preventing illegal use of data (digital contents) distributed/delivered to a user through a recording medium such as a CD and a DVD, an internet line, a telephone line or the like, to a data reading method for reading the data processed by this processing method, and to a recording medium in which programs implementing these methods are stored.

BACKGROUND ART

The following system has been proposed as this type of conventional example. The system comprises a recording medium for distribution such as CD-ROM on which encrypted digital contents are recorded, management means for managing charges in accordance with the use of the digital contents by a user, a digital contents reproducing device which is used when the digital contents are reproduced by the user who has acquired the recording medium for distribution, and which can be connected to the management means via an internet line. A basic configuration of the system is such that when an application for digital contents is inputted to the digital contents reproducing device by the user under the condition of authentication and billing, the digital contents reproducing device transmits the application to the management means via the internet line, and the management means, after confirming authentication and billing of the user relating to the relevant application, transmits a decryption key data to the digital contents reproducing device via the internet line, and the digital content reproducing device decrypts the digital contents on the recording medium for distribution by using the decryption key data to reproduce it (for example, refer to Patent Document 1 or the like).

Patent Document 1: Japanese Published Unexamined Application No. 2002-334172.

However, in the case of the above-mentioned conventional example, in the digital contents reproducing device, once the digital contents on the recording medium for distribution is decrypted, not only the reproduction but also copy can be performed easily, so that it has an essential drawback that secondary illegal use cannot be prevented.

However, while the secondary illegal use can be prevented if there is added a function of automatically deleting the digital contents after a predetermined period of time from a reproduction application has passed, there arises another drawback that the collection of charges in accordance with the secondary use cannot be expected any longer.

This problem is not specific to the case where digital contents are distributed to a user through a recording medium for distribution, but there is a similar problem in the case where the digital contents are delivered through an Internet line or the like. Namely, profits that a contents holder or the like should obtain under normal circumstances are illegally lost, and in this regard, the distribution of the digital contents is impeded from being promoted under the present situation.

The present invention is created under the above-described background, and a first object of the present invention is to prevent illegal use of data (digital contents) and a second object is to provide a method for processing the data in which the collection of charges in accordance with secondary use of the data can be surely performed, a data reading method for reading the data processed by this processing method, and a recording medium on which programs implementing these methods are recorded.

DISCLOSURE OF THE INVENTION

In order to solve the above-described problems, a data illegal use preventing method of the present invention is characterized in that, in a method for processing data in which the data is encrypted and decrypted on a basis of a decryption bit length, thereby being read, the data is encrypted, a part of this data with a bit length different from the decryption bit length is omitted, and the omitted part is closed so as to make the data continuous.

Said data can be compressed before encryption. It is preferable that after said omitted part of the data is closed so as to make the data continuous, dummy data of the same bit length as that of the omitted data is added at the end of the data.

the bit length of the omitted data is a bit length different from a devisor of the decryption bit length.

In the case where the data is omitted at a plurality of positions, the bit length of the omitted data×the number of omission positions is a bit length different from the divisors of the decryption bit length.

A method for reading data of the present invention is a method for reading data using a data reading device for reading the data processed by the processing data method according to claim 1 and recorded in advance on a recording medium or on an auxiliary storage section of the data reading device, and which is a system including electronic equipment having an auxiliary storage device for pre-recording the omitted data and location information indicating in which part of the data the omitted data is located and said data reading device connected to the electronic equipment via a communication line, characterized in that the data reading device send a request to the electronic equipment via the communication line for the omitted data relating to the data to read and its location information in accordance with operation inputs, and the electronic equipment transmits the omitted data and its location information simultaneously or sequentially in reply to the request, the data reading device receives the omitted data and its location information to record them on the auxiliary storage section, and thereafter, in order to sequentially transfer the data on the recording medium or on the auxiliary storage section to a main storage section and to sequentially decrypt the data on the main storage section on the decryption bit length basis and read it, the location information on the auxiliary storage section is transferred to the main storage section, with reference to the location information, the omitted part of said data is recognized, and the omitted data on the auxiliary storage section is transferred to the main storage section, while the data on the recording medium or on the auxiliary storage section is transferred to the main storage section and the omitted data is connected to the omitted part of the data on the main storage to decrypt the data on the decryption bit length basis.

In the case where said data is encrypted before compression, the data reading device send a request to the electronic equipment via the communication line for the omitted data relating to the data to read and its location information in accordance with operation inputs, and the electronic equipment transmits the omitted data and their location information simultaneously or sequentially in reply to the request; the data reading device receives the omitted data and its location information to record them on the auxiliary storage section; and thereafter, in order to sequentially transfer the data on the recording medium or on the auxiliary storage section to a main storage section, to sequentially decrypt the data on the main storage section on a decryption bit length basis, and to restore the data from a compressed state to an original state and read it, the location information on the auxiliary storage section is transferred to the main storage section, with reference to the location information, the omitted part of said data is recognized, and the omitted data on the auxiliary storage section is transferred to the main storage section, while the data on the recording medium or on the auxiliary storage section is transferred to the main storage section and the omitted data is connected to the omitted part of the data on the main storage to decrypt the data on the decryption bit length basis and restore the data from the compressed state to the original state.

Said electronic equipment can be management means for managing the use of the data by the transmission of the omitted data and the location information.

The data recorded on the recording medium or on the auxiliary storage section of the data reading device is recorded in advance on said auxiliary storage device of the electronic equipment or on another auxiliary storage device, and is transmitted from the electronic equipment in accordance with the request of the data reading device to the electronic equipment via the communication line, and is recorded on the auxiliary storage section of said data reading device.

In the case where said data is permitted to be read for a predetermined period, it is preferable that the data reading device obtains an elapsed period from a point of time when the omitted data is received, and when the relevant elapsed period reaches the predetermined period, the data reading device deletes at least the omitted data on the auxiliary storage section.

It is also possible that the data reading device obtains an elapsed period from a point of time when the data is received, separately from the omitted data, and when the relevant elapsed period reaches a predetermined period, the data reading device deletes the data on the auxiliary storage section.

EFFECT OF THE INVENTION

In the case of the method for processing data according to claim 1 of the present invention, the data is encrypted, part of the data with the bit length different from the decryption bit length thereof is omitted, and the omitted part is closed so as to make the data continuous, so that a data row of the data after the omitted part becomes different from a data row when it was encrypted (that is, data row before omission). Consequently, in reading the data by the data reading device, when the part of the data after the omitted part is sequentially transferred to the main storage section and the data on the main storage section is sequentially decrypted by the decryption bit length, the data row of the data is different from the data row when it was encrypted, so that the data row does not return to the original data row before the encryption but is converted into an unknown sequence of numbers or alphanumerics. As a result, the data after the omitted part cannot be read, thereby preventing the illegal use of the data.

In the case of the method for processing data according to claim 2 of the present invention, the data is encrypted before compression. Such data is transferred to the main storage section of the data reading device, is decrypted by the decryption bit length, and is restored from the compressed state to the original state. Since the part of the data after the omitted part is converted into an unknown sequence of numbers or alphanumerics when decrypted, if an attempt is made to restore this unknown sequence of numbers or alphanumerics from the compressed state to the original state, the restoring process of the data by the data reading device will stop. Therefore, there are advantages for preventing the illegal use of the data.

In the case of the method for processing data according to claim 3 of the present invention, after the omitted part of said data the omitted part is closed so as to make the data continuous, dummy data of the same bit length as that of the omitted data is added at the end of the data. Specifically, the data length remains the same before and after the omission. Thereby, a third person will not know whether or not said data is partially omitted. Therefore, there are advantages for preventing the illegal use of the data.

In the case of the method for processing data according to claim 4 of the present invention, the bit length of the omitted data is a bit length different from a devisor of the decryption bit length. If the bit length of the omitted data is a divisor of the decryption bit length, the data row of the data after the omitted part which is transferred to the main storage section of the data reading device becomes the same as the data row when it was encrypted (that is, the data row before omission), so that the data other than the omitted part can be read. This can be prevented by the above-mentioned method.

In the case of the method for processing data according to claim 5 of the present invention, a product of the bit length of the omitted data and the number of omissions is a bit length different from the divisor of the decryption bit length. Therefore, if the product of the bit length of the omitted data and the number of omissions is a divisor of the decryption bit length, the data row of the data after the omitted part which is transferred to the main storage section of the data reading device becomes the same as the data row when it was encrypted (that is, the data row before omission), so that the data other than the omitted part can be read. This can be prevented by the above-mentioned method.

In the case of the method for reading data according to claim 6 of the present invention, the data reading device requests the omitted data and its location information which are recorded on the auxiliary storage device of the electronic equipment and records them on the auxiliary storage section of the data reading device, and thereafter, in order that the data reading device reads the data on the recording medium or on the auxiliary storage section, with reference to said location information, the omitted part of the data is recognized, the omitted data on the auxiliary storage section and the data on the recording medium or on the auxiliary storage section are transferred to the main storage section, the omitted data is connected to the omitted part of the data, and the data on the main storage section is decrypted by the decryption bit length and is read. Thus, by connecting the omitted data to the omitted part of the data, the data row in the vicinity of the omitted part is returned to the data row when it was encrypted. Therefore, when the data in the vicinity of the omitted part is decrypted, since it is not converted into an unknown sequence of numbers or alphanumerics, the data can be read. Namely, unless a user obtains the omitted data which is omitted as an authentic user, he cannot read the data, so that the illegal use of the data can be prevented. In addition, even if data recorded on the recording medium is simply copied, the user is required to obtain the omitted data as an authentic user to read the relevant data. Therefore, the collection of charges in accordance with secondary and tertiary use can be ensured.

In the case of the method for reading data according to claim 7 of the present invention, the data reading device requests the omitted data and its location information which are recorded on the auxiliary storage device of the electronic equipment and records them on the auxiliary storage section of the data reading device, and thereafter, in order that the data reading device reads the data on the recording medium or on the auxiliary storage section, with reference to said location information, the omitted part of the data is recognized, the omitted data on the auxiliary storage section and the data on the recording medium or on the auxiliary storage section are transferred to the main storage section, the omitted data is connected to the omitted part of the relevant data, the data on the main storage section is decrypted by the decryption bit length, and the relevant data is restored from the compressed state to the original state and is read. Thus, by connecting the omitted data to the omitted part of the data, the data row in the vicinity of the omitted part is returned to the data row when it was encrypted. Therefore, when the data in the vicinity of the omitted part is decrypted, since it is not converted into an unknown sequence of numbers or alphanumerics, the restoring process does not stop and the data can be read. Namely, unless a user obtains the omitted data which is omitted as an authentic user, he cannot read the data, so that the illegal use of the data can be prevented. In addition, even if data recorded on the recording medium is simply copied, the user is required to obtain the omitted data as an authentic user to read the relevant data. Therefore, the collection of charges in accordance with secondary and tertiary use can be ensured.

In the case of the method for reading data according to claim 8 of the present invention, said electronic equipment is management means for managing the use of the data by the transmission of the omitted data and the location information. Therefore, the invention enables billing or other processes in accordance with the use of the data.

In the case of the method for reading data according to claim 9 of the present invention, the data recorded on the recording medium or on the auxiliary storage section of the data reading device is recorded in advance on said auxiliary storage device of the electronic equipment or on another auxiliary storage device, and is transmitted from the electronic equipment in accordance with the request of the data reading device to the electronic equipment via the communication line, and is recorded on the recording medium or on the auxiliary storage section of said data reading device. Therefore, the data is easily made available.

In the case of the method for reading data according to claim 10 of the present invention, the data reading device obtains an elapsed period from a point of time when the omitted data is received, and when the elapsed period reaches a predetermined period, the data reading device deletes the transmitted omitted data. Consequently, the illegal secondary use of the data can be prevented.

In the case of the method for reading data according to claim 11 of the present invention, the data reading device obtains an elapsed period from a point of time when the data is received, separately from the omitted data, and when the relevant elapsed period reaches a predetermined period, the data reading device deletes the transmitted data, so that the data does not remain in the data reading device for a longer period than the predetermined period. Therefore, there are advantages for preventing the copy of the data for an illegal purpose.

The recording medium according to claim 12 of the present invention enables similar effects to those of claims 1 to 5. The recording medium according to claim 13 of the present invention enables similar effects to those of claims 6 to 11.

DESCRIPTION OF REFERENCE NUMERALS

| | |
|---|---|
| α | recording medium for distribution |
| 100 | digital contents illegal use preventing system |
| 101 | management center |
| 120 | digital contents reproducing device |
| 140 | device for creating a recording medium for distribution |
| 200, 300 | digital contents illegal use preventing system |
| 210, 310 | delivery management center |
| 220, 320 | digital contents reproducing device |
| 400 | digital contents illegal use preventing system |
| 410 | management center |
| 420 | digital contents reproducing device |
| 500 | digital contents illegal use preventing system |

-continued

| | |
|---|---|
| 510 | delivery management center |
| 520 | digital contents reproducing device |

BEST MODE FOR CARRYING OUT THE INVENTION

Hereinafter, the embodiments of the present invention are described.

Embodiment 1

Figure 1:
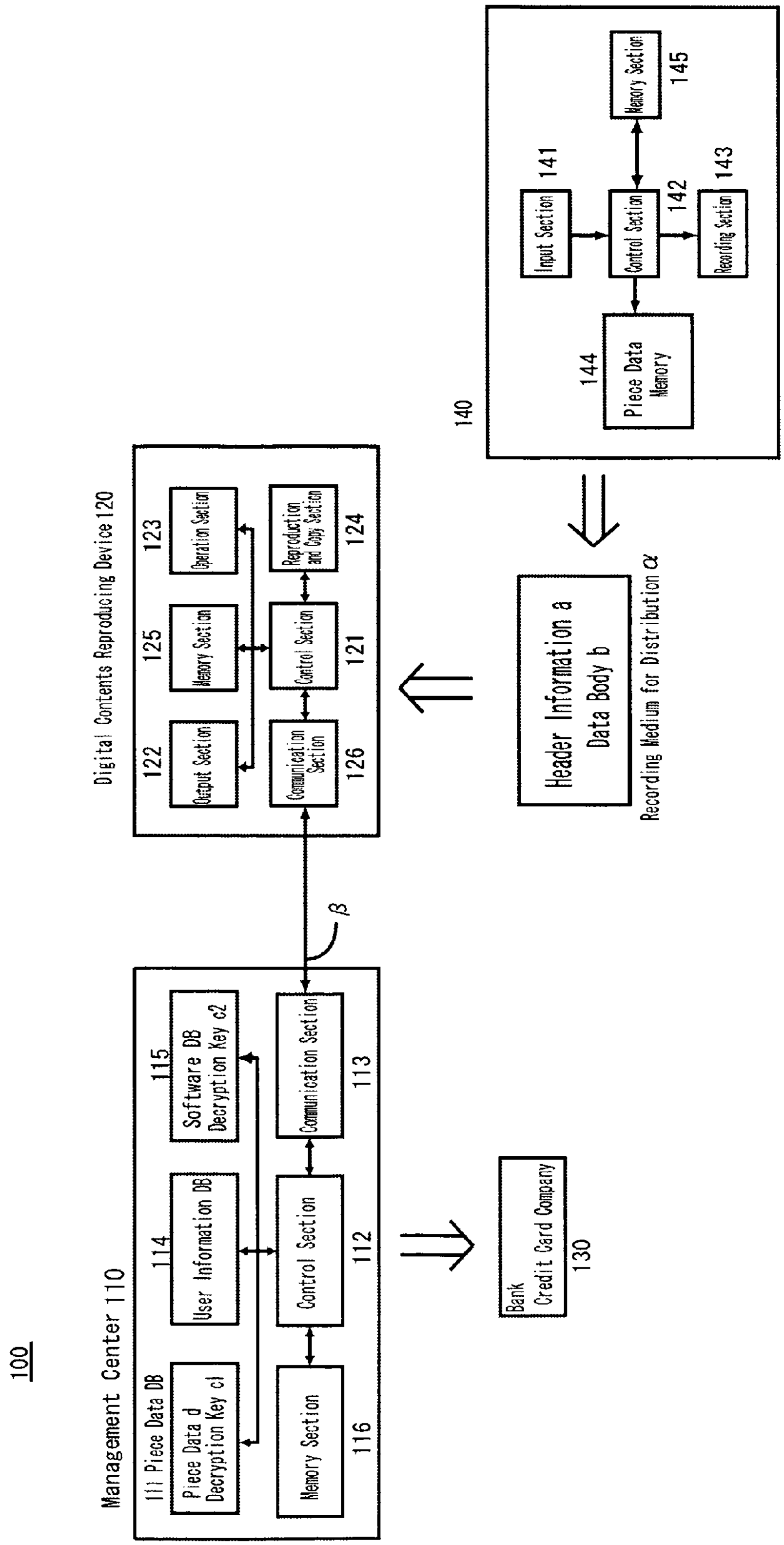
FIG. 1 is a diagram for explaining a first embodiment of the present invention, which is a configuration diagram of a digital contents illegal use preventing system, including a configuration diagram of a device for creating a recording medium for distribution used in this system.
Figure 2:
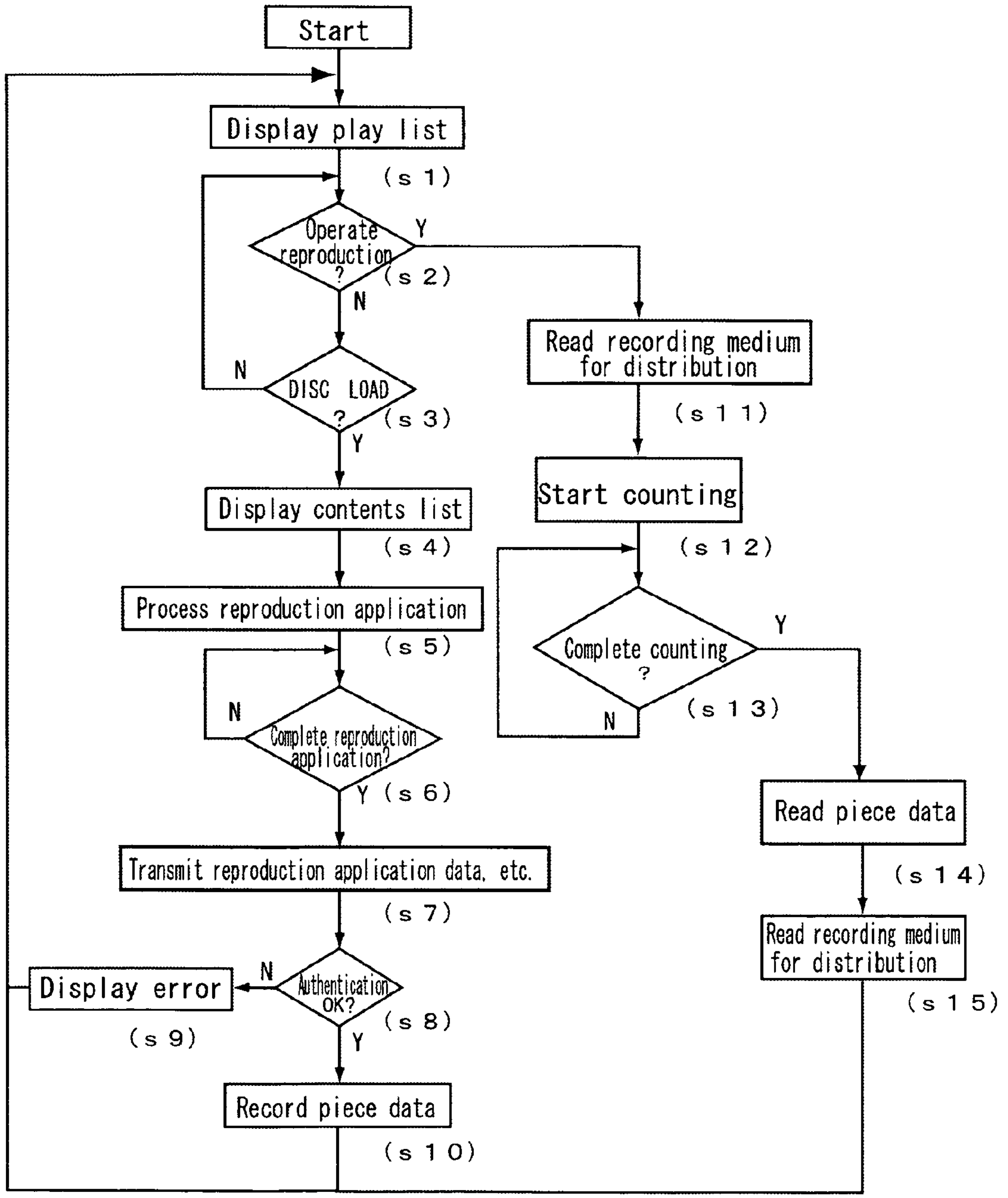
FIG. 2 is a flowchart of reproduction software used for this system.
Figure 3:
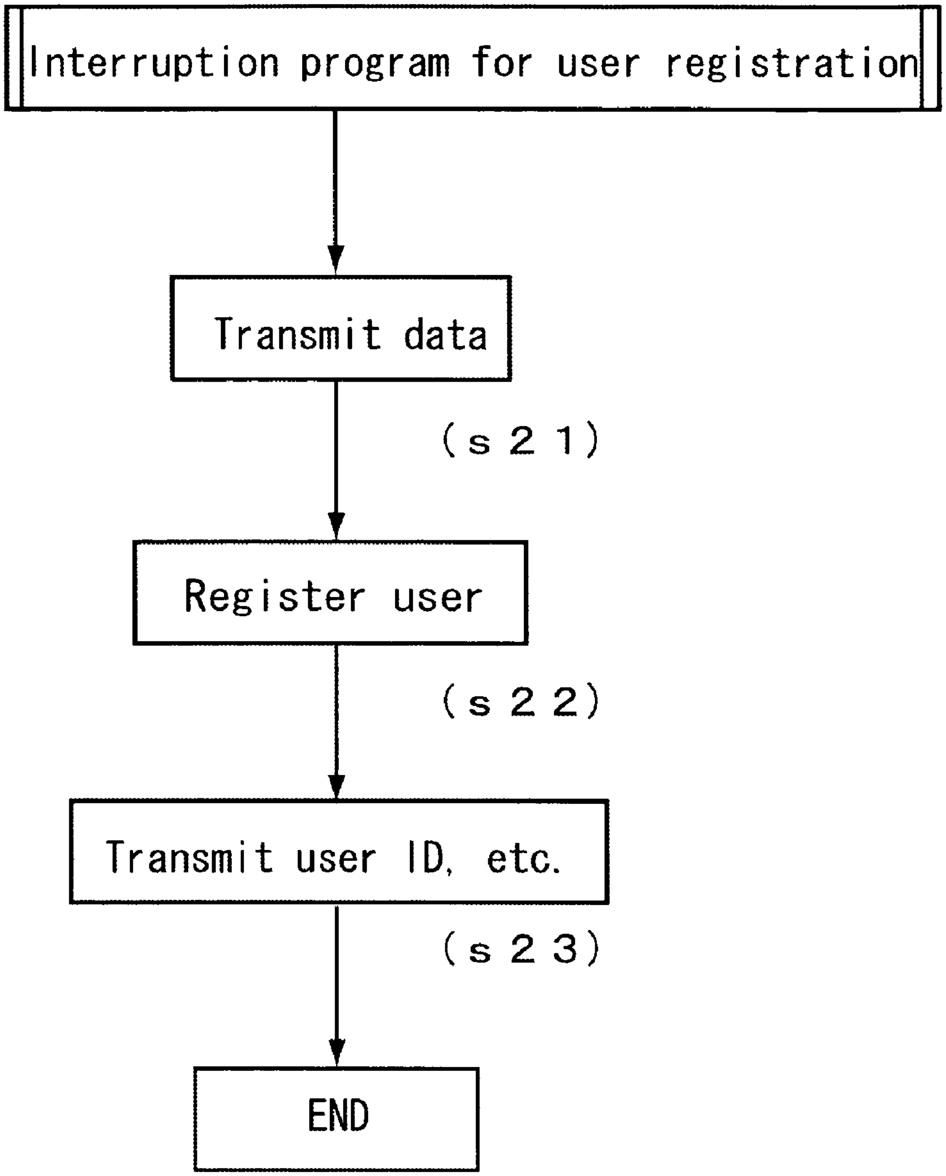
FIG. 3 is a flowchart of an interruption program for user registration which is processed by a control section in a management center of this system.
Figure 4:
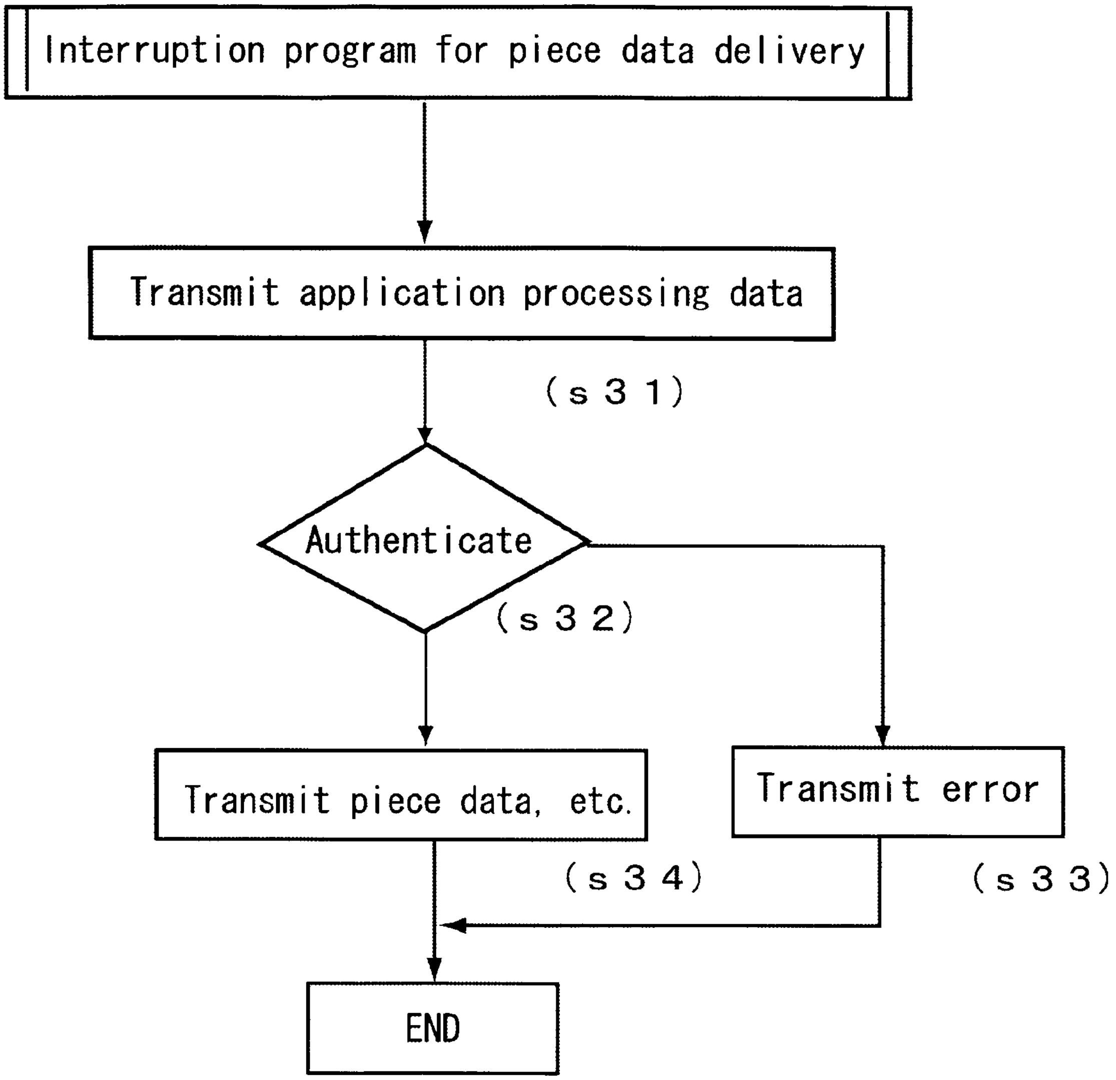
FIG. 4 is a flowchart of an interruption program for piece data delivery which is processed by the control section in the management center of this system.

A first embodiment of the present invention is first described with reference to FIGS. 1 and 2. FIG. 1 is a configuration diagram of a digital contents illegal use preventing system as shown in FIG. 1, including a configuration diagram of a device for creating a recording medium for distribution used for this system, FIG. 2 is a flowchart of reproduction software used for this system, FIG. 3 is a flowchart of an interruption program for user registration which is processed by a control section in a management center of this system, and FIG. 4 is a flowchart of an interruption program for piece data delivery which is processed by the control section in this management center.

A digital contents illegal use preventing system 100 as shown in FIG. 1 is a system preventing a contents file on a recording medium for distribution α which has been distributed to a user for a rental purpose from being used illegally. The object of rental is the contents file, not the recording medium for distribution α itself.

This system has a basic structure comprising the recording medium for distribution α on which a contents file having header information a and a data body b is recorded with part of the data body b (omitted data) omitted, a management center 110 (electronic equipment) which is management means for managing the utilization of the contents file on the recording medium for distribution α, in which piece data d consisting of the omitted data and location information indicating in which part of the data body b the relevant omitted data is located is prepared in advance, and which can deliver the relevant piece data d via a communication line β, and a digital contents reproducing device 120 (data reading device) which is a device used when the contents file on the recording medium for distribution α is reproduced and copied, having a function of intercommunicating with the management center 110 via the communication line β.

The communication line β is a wired or wireless internet line such as a digital line including an optical communication line or analog line including a telephone line, or a line transmitting/receiving an electric wave signal such as digital broadcasting or satellite broadcasting, and this is used to perform intercommunication between the management center 110 and the digital contents reproducing device 120.

The recording medium for distribution α is a general recording medium such as CD and DVD. The contents file on the recording medium for distribution α has the data body b (data) which is data of music, moving image, static image, text, game, software or the like, and the header information a containing reproduction information for reproducing this data body b, and contents information such as a contents ID assigned to this data body b and a WEB address information of the management center 110, and after the header information a and the data body b are encrypted, respectively, the contents file obtains a data structure in which part of the relevant data body b is omitted. At the beginning of the data body b, starting location information indicating a starting location of the relevant data body b is recorded. The location information indicating in which part of the data body b the omitted data is located is a data length or a time from the starting location information to the omitted part. Reproduction information is an address value to be read first or the like.

The management center 110 is a server operated by a person doing a business in which the data body b on the recording medium for distribution α is rented to a user and a rental fee is collected from the user under an agreement between the user and an owner of copyright or the like of a copyrighted work contained in the data body b. In the figure, reference numeral 111 denotes a piece data DB (an auxiliary memory device) on which the piece data d and a decryption key c2 necessary for decrypting the data body b of the contents file are recorded in advance, reference numeral 112 denotes a control section such as a computer, reference numeral 113 denotes a communication section for performing communication, reference numeral 114 denotes a user information DB on which user information is recorded and information such as authentication and accounting based on the user information is recorded sequentially, reference numeral 115 denotes a software DB on which the reproduction software and a decryption key c1 necessary for decrypting the header information a of the contents file are recorded in advance, and reference numeral 116 denotes a memory section such as a hard disk.

On the memory section 116, in addition to basic programs such as an operation system as a server, an interruption program for user registration as shown in FIG. 3, an interruption program for reproduction software download not shown in the figure, an interruption program for piece data delivery as shown in FIG. 4 and the like are recorded. The contents of these programs will be described later. By processing these programs in the control section 112, this server exerts a function as the management center 110. Furthermore, on the memory section 116, data necessary for user registration processing and data necessary for reproduction application processing are recorded.

The contents ID indicating the corresponding contents file is added to the piece data d on the piece data DB 111. Thus, by using the contents ID, a correspondence relationship between the contents file on the recording medium for distribution α and the piece data d on the piece data DB 111 coincides. Similarly, a user ID and a player ID of a corresponding user are added to the user information on the user information DB 114. Thus, by using the user ID or the player ID, a correspondence relationship between the user and the user information in the user information DB 114 coincides.

Since this management center 110 confirms (namely, authenticates) the user ID and a password and in addition, confirms whether or not the player ID coincides before transmitting the piece data d to the digital contents reproducing device 120, the player ID is also useful for preventing illegal use.

The digital contents reproducing device 120 is a general-purpose computer used by the user. In the figure, reference numeral 121 denotes a control section such as CPU, reference numeral 122 denote an output section such as a monitor and a speaker, reference numeral 123 denotes an operation section such as a keyboard and a mouse, reference numeral 124 denotes a reproduction and copy section reading/writing the data with respect to the recording medium for distribution α and the like, and reference numeral 125 denotes a memory section (auxiliary storage section) such as a hard disk, and reference numeral 126 denotes a communication section for performing communication.

On the memory section 125, in addition to basic programs such as an operation system as a computer, the reproduction software as shown in FIG. 2 is recorded. This reproduction software is chargeable or free software downloaded through the communication line β from the management center 110 under the condition of user registration, and application software necessary for reproducing the contents file on the recording medium for distribution α. Furthermore, the player ID assigned to the reproduction software is transmitted from the management center 110 to the memory section 125 together with the relevant reproduction software to be stored. Further, on the memory section 125, the piece data d, the decryption keys c1, c2 and the like which have been transmitted from the management center 110 are recorded, and rental information indicating a rental period and the like are recorded.

The contents of the reproduction software will be described later. The processing of this software by the control section 121 allows this computer to exert the function as the digital contents reproducing device 120.

The operation of the digital contents illegal use preventing system 100 configured as described above is described and in conjunction of this, the operation of the management center 110, the operation of the digital contents reproducing device 120, and the contents of the respective programs are described.

The user operates the operation section 123 of his or her own computer (computer equivalent to the digital contents reproducing device 120, which is in a state that the reproduction software as shown in FIG. 2 is not downloaded) to access the management center 110 via the communication line β and to request user registration. The management center 110 processes the interruption program for user registration as shown in FIG. 3 in accordance with this request, and transmits the data necessary for the user registration to the computer (s21). Thereafter, the user inputs his or her name, address and payment condition, "a bank account number or a credit card number of his or hers, etc." as displayed in a user registration screen through the operation section 123 of the computer and transmits this registration data to the management center 110 via the communication line β. Then, the management center 110 creates a user ID and a password in accordance with this to register the relevant user ID and the like in the user information DB 114 together with the registration data as user information (s22). On the other hand, the relevant user ID and the password are transmitted to the computer of the user via the communication line β (s23). Then, the processing of the interruption program for user registration is finished. The user ID and the password may be inputted by the user himself or herself at the time of user registration.

Thereafter, the user operates his or her computer to access the management center 110 and inputs a request for the download of the reproduction software. At this time, the user ID and the password are required. Then, the computer of the user transmits the request to the management center 110 via the communication line β. The management center 110 processes the interruption program for reproduction software download in accordance with this request, reads out the reproduction software and the decryption key c1 on the software DB 115, and transmits them to the computer of the user via the communication line β. Then, the reproduction software as shown in FIG. 2 is downloaded to the memory section 125 of the computer and installed. At the same time, the decryption key c1 is recorded on the memory section 125. This makes the computer into the digital contents reproducing device 120.

When the recording medium for distribution α is set in the reproduction and copy section 124 by the user and the execution of the reproduction software is operated, this digital contents reproducing device 120 processes the relevant reproduction software, and outputs and displays data of a play list showing a reproducing player and rented contents contained in the relevant reproduction software on the output section 122. Then, the play list is displayed on a screen of the relevant reproducing player (s1). Namely, the contents file having a predetermined flag hoisted, which indicates that a reproduction application has been made, is displayed on the play list. Then, based on this play list, whether or not reproducing operation has been performed is determined through the operation section 123 (s2).

If it is determined that the reproducing operation has not been performed, then it is determined whether or not reading operation (operation of DISC LOAD) of the recording medium for distribution α has been performed through the operation section 123 (s3). If the operation of DISC LOAD is performed, then a contents list showing a contents file for which reproduction application has not been made is outputted and displayed on the output section 122 (s4). Namely, while the decryption key c1 on the memory section 125 is read out, the header information a of a contents file with the predetermined flag not hoisted among the contents files on the recording medium for distribution α is read out and decrypted by using the relevant decryption key c1 to read out contents information contained in the relevant header information a and to display it on the contents list.

Thereafter, when an application for reproduction of the contents file on the contents list is performed by the user, the decryption key c1 on the memory section 125 is read out and meanwhile, the header information a of the contents file on the recording medium for distribution α is read out and decrypted by using the relevant decryption key c1 to read out the contents information contained in the relevant header information a. Then, based on a WEB address contained in the relevant contents information, the contents ID contained in the relevant contents information is transmitted to the management center 110 via the communication line β. In this manner, the execution of the reproduction application processing is transmitted.

The management center 110 processes the interruption program for piece data delivery as shown in FIG. 4. Then, it reads out the data necessary for the reproduction application processing from the memory section 116 and transmits it to the digital contents reproducing device 120 via the communication line β (s31). Based on this data, the digital contents reproducing device 120 outputs and displays a reproduction application screen on the output section 122 (s5).

Thereafter, when the user sequentially inputs or selects a rental period through the operation section 123 as displayed on the reproduction application screen (this determines a rental amount of money), and finally inputs the user ID and the password through the operation section 123 as a reproduction application of the recording medium for distribution α (s6), the digital contents reproducing device 120 shifts the display output of the output section 122 to an authentication screen, while the inputted application data is transmitted to the management center 110 via the communication line β. At this time, the contents ID contained in the contents information of the header information a on the recording medium for distribution α and the player ID on the memory section 125 are read out and transmitted to the management center 110 together with the application data (s7).

The management center 110 confirms the authentication of the user relating to the application (s32). Namely, with reference to the transmitted user ID and player ID of the user etc., the user information of the relevant user is read out from the user information DB 114, and whether or not the relevant user is an authentic user is confirmed. At this time, the management center 110 has in advance prepared a list of inappropriate persons with nonpayments of rental fee more than or equal to predetermined times or the like in the user information DB 114, and in addition to the authentication, confirms whether or not the user falls under the list of inappropriate persons (this confirmation of the list of inappropriate persons is arbitrary).

In the case where the management center 110 has confirmed that the user relating to the application is an unauthentic user or an authentic user but a person who falls under the list of inappropriate persons, the rejection of the application of the user is transmitted to the digital contents reproducing device 120 via the communication line β (s33). Then, the interruption program for piece data delivery is finished.

On the other hand, in the case where it has been confirmed that the user relating to the application is an authentic user and a person who does not fall under the list of inappropriate persons, with reference to the player ID of the user or the like, accounting is recorded on the user information of the user on the user information DB 114, while with reference to the contents ID, the piece data DB 111 is searched to read out the decryption key c2 and the piece data d corresponding to the relevant contents ID, and to transmit them to the digital contents reproducing device 120 as a reply indicating that the application of the user is accepted together with the rental information indicating the rental period and the like which are contained in the application data via the communication line β (s34). Then, the processing of the interrupt program for piece data delivery is finished.

The charges are summed up based on the user information DB 114 for every predetermined period, and is charged to a bank/a credit card company 130 or charged directly to the user, so that the user transfers the charge to an account or pays it in a convenience store or the like. Furthermore, in the case where the management center 110 is connected to the bank/credit card company 130 via the communication line β, it is obviously possible to immediately settle accounts, too.

Thereafter, upon receiving the rejection of the application of the user via the communication line β (s8), the digital contents reproducing device 120 outputs and displays an error message on the output section 122 (s9). On the other hand, when the piece data d and the like are received via the communication line β (s8), the predetermined flag is hoisted, while the decryption key c2, the piece data d and the rental information are recorded on the memory section 125 (s10). At the same time, by using a clock function of the computer, a piece data transmission date and time is recorded on the memory section 125. Then, the play list is updated, and outputted and displayed on the output section 122, so that a file name of the contents file with the piece data d obtained is displayed on the relevant play list (s1).

Thereafter, when the reproducing operation of the contents file is performed based on the play list through the operation section 123 (s2), the digital contents reproducing device 120 reads out the decryption key c1 on the memory section 125, and meanwhile, it reads out the header information a relating to the relevant contents file on the recording medium for distribution α and decrypts the header information a by using the decryption key c1. Then, the data body b on the recording medium for distribution α is read out by using the reproduction information contained in the relevant header information a and is reproduced while being decrypted with the decryption key c2 on the memory section 125 (s11). In addition, while the starting location information of the data body b on the recording medium for distribution α is read out, the piece data d on the memory section 125 is read out and the counting of a data length or a time from the starting location information to the location information contained in the piece data d is started (s12). Thereafter, whether or not the counting is finished is determined (s13). Thereby, the omitted part of the data body b is recognized. As a result of this determination, when it is determined that the counting is finished and the omitted part of the data body b is recognized, the piece data d on the memory section 125 is read out and the omitted data contained in the relevant piece data d is read out as the data of the omitted part of the relevant data body b and is reproduced while being decrypted with the decryption key c2 on the memory section 125 (s14). Then, the data body b on the recording medium for distribution α is read out again and is subsequently reproduced while being decrypted with the decryption key c2 on the memory section 125 (s15). This reproduction software program is finished upon end processing by the user.

Furthermore, the reproduction software, in addition to the above-described basic function, has a piece data management function which is resident in the digital contents reproducing device 120 to manage the piece data d when the digital contents reproducing device 120 is turned ON. This piece data management function manages the piece data d on the memory section 125, while it obtains a difference between a piece data transmission data and time and a current date and time as an elapsed period from a time point when the piece data d is transmitted, and when this reaches the rental period contained in the rental information, it is determined to be outside of the rental period, and the piece data d and the decryption key c2 on the memory section 125 are deleted, while the predetermined flag is hauled down.

Thus, in this system 100, even when the user operates to reproduce the recording medium for distribution α by using the digital contents reproducing device 120, the data body b of the contents file on the recording medium for distribution α cannot be reproduced unless the user obtains the piece data d from the management center 110 as an authentic reproduction applicant. In this manner, the temporary, illegal use of the contents file on the recording medium for distribution α can be prevented. In addition, with respect to the contents file whose rental period has passed, the piece data d is deleted, which can prevent secondary illegal use. Furthermore, even if the recording medium for distribution α is copied to another recording medium for distribution by the user, since in the contents file recorded on the another recording medium for distribution, the reproduction information contained in the header information a is omitted, the contents file cannot be reproduced unless the user obtains the piece data d as an authentic reproduction user. Therefore, tertiary, illegal use can also be prevented.

Furthermore, outside of the rental period of the recording medium for distribution α, only the piece data d or the like on the memory section 125 is deleted automatically, and the contents file on the recording medium for distribution α remains as it is. Thus, the contents file can be created by copying the recording medium for distribution α to a new recording medium, using the digital contents reproducing device 120. In order to reproduce such a contents file on the recording medium for distribution α, authentication to the management center 110 and payment of rental fee by using the digital contents reproducing device 120 are required, so that the collection of charges in accordance with the secondary and tertiary use can be ensured.

In addition, since the charge relating to the contents file data body b is designed to be collected in the reproduction application separately from the recording medium for distribution α, it is also possible that the recording medium for distribution α is distributed for free and thereafter, the billing is performed to an applicant for reproduction. Alternatively, it is also possible that the recording medium for distribution α is sold only at an amount of money relating to this and thereafter, the billing is performed with respect to an applicant for reproduction. Furthermore, in the case where the contents of the contents file recorded on the recording medium for distribution α are those of a specialized book such as a medical book, the contents of the specialized book such as the medical book are divided item by item and each item is recorded as one contents file on the recording medium for distribution α, which allows reproduction application for each item. This makes it possible to always have an even expensive specialized book ready at home and refer to it by applying for reproduction (on a rental basis) for each item as necessary. By using this system in this manner, various novel business forms can be addressed.

Furthermore, in the case where a plurality of contents files are recorded on the recording medium for distribution α, from the standpoint of the user, only the contents file which he or she wants to listen to or view can be rented. On the other hand, from the standpoint of a creator of the recording medium for distribution α, since the recording medium for distribution α can be made into the one on which arbitrary contents files are recorded without considering the taste of each user, fashion or the like, creation costs of the relevant recording medium for distribution α can be reduced.

Figure 5:
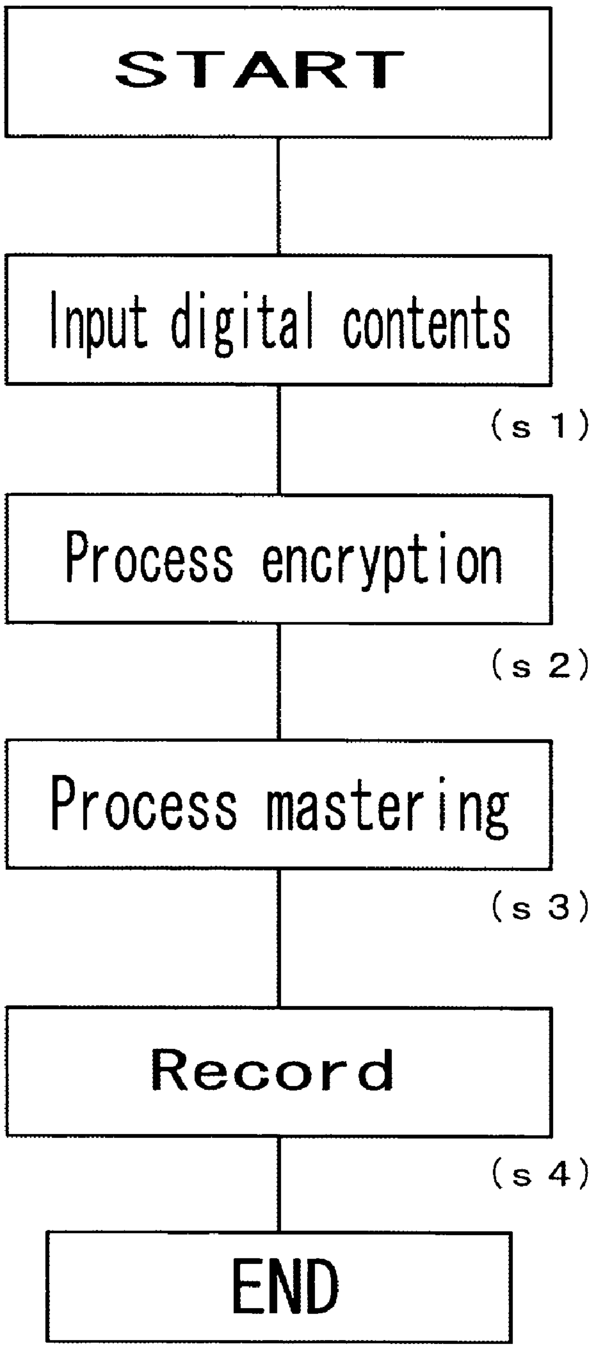
FIG. 5 is a flowchart of a recording medium creating software executed by a computer which is the device for creating a recording medium for distribution used for this system.

Here, a description of a device for creating a recording medium for distribution 140 which is used to create the recording medium for distribution α is given with reference to FIGS. 1 and 5. FIG. 5 is a flowchart of a recording medium creating software executed by a computer which is a device for creating a recording medium for distribution used for this system.

The device for creating a recording medium for distribution 140 is a device used by a proprietor of the management center 110 or a person concerned with the same, and has a configuration in which part of the relevant data body b is separated from a contents file having the header information a and the data body b, and the relevant omitted data and the location information thereof are recorded as the piece data d, while the contents file with the piece data d separated is recorded on the set recording medium to create the recording medium for distribution α. Here, a computer is used.

In FIG. 1, reference numeral 141 denotes an input section reading out digital contents from a master disk, reference numeral 142 denotes a control section such as CPU which processes the recording medium creating software shown in FIG. 5, reference numeral 143 denotes a recording section in which a recording medium such as CD and DVD can be set and which records a contents file on the recording medium, reference numeral 144 denotes a piece data memory recording the piece data d separated from the contents file, and reference numeral 145 denotes a memory section such as a hard disk on which the recording medium creating software is recorded.

Hereinafter, the contents of the recording medium creating software shown in FIG. 5 are described, and in addition, the operation of the device for creating a recording medium for distribution 140 is described.

The device for creating a recording medium for distribution 140, upon being turning On, processes the recording medium creating software on the memory section 145. Then, the master disk is set manually or automatically in the input section 141. Furthermore, a recording medium such as DVD is sequentially set in the recording section 143.

The contents file is read out from the master disk set by the input section 141 (s1), and the header information a and the data body b of the relevant contents file are encrypted, respectively (s2). Thereafter, part of the data body b contained in the contents file is separated, and the relevant separated omitted data is recorded on the piece data memory 144 as the piece data d together with its location information (s3). Meanwhile, the relevant contents file is recorded on the recording medium such as DVD which is set in the recording section 143 (s4). This finishes the software. The piece data d recorded on the piece data memory 144 is transferred to the management center 110 via the communication line β. In such a manner, the recording medium for distribution α is created. The piece data d can be recorded on the piece data memory 144 can also be recorded on the recording medium and sent to the management center 110.

The digital contents illegal use preventing system 100 as described above may be subject to any design modification as long as it comprises a recording medium for distribution on which a contents file having header information and a data body is recorded with part of the data body omitted, management means which is means for managing the utilization of the contents file on the recording medium for distribution, has a data base on which the omitted data and location information indicating in which part of the data body the omitted data is located are recorded and can transmit the relevant omitted data and its location information via a communication line, and a digital contents reproducing device which is used at least in reproducing the contents file on the recording medium for distribution and has a function capable of intercommunication with the management means via the communication line, wherein when an application for reproduction of the contents file is inputted to the digital contents reproducing device by a user, the digital contents reproducing device transmits the relevant application to the management means via the communication line, and the management means transmits the omitted data and its location information of the contents file relating to the relevant application simultaneously or subsequently to the relevant digital contents reproducing device via the communication line, and the digital contents reproducing device receives the relevant omitted data and the location information simultaneously or subsequently to record them on a memory section and reads out the data body of the contents file on the recording medium for distribution to reproduce it, and at the same time, recognizes the omitted part of the data body with reference to the location information read out from the memory section and reads out and reproduces the omitted data on the memory section as the data of the relevant omitted part.

Therefore, in the recording medium for distribution α, although the header information a and the data body b are encrypted, respectively, it is arbitrary whether or not the encryption is performed. However, it is desirable that at least the data body b is encrypted. Furthermore, while the contents file is structured to have the header information a and the data body b, it is obviously possible to record the contents file with other information added thereto. This other information includes a program by which it is determined whether or not the reproduction software has been installed in the computer of the user, and when it is determined that the reproduction software has not been installed, HP of the management center 110 is automatically accessed, and the like. When this program has been recorded and the user sets the recording medium for distribution α which he or she has in advance obtained in his or her computer (computer equivalent to the digital contents reproducing device 120, which is in a state that the reproduction software is not downloaded), the WEB address of the management center 110 is read out, and based on this, the management center 110 is accessed. Thereafter, the reproduction software can be obtained by the above-described procedure. Although the contents file is designed such that a part thereof is omitted, it can be obviously designed such that a plurality of points are omitted.

While the location information is designed to be a data length or a time from the starting location information to the omitted part, it may be an address value indicating the omitted part or the like. In this case, it is sequentially determined whether or not an address value of the data body b on the recording medium for distribution α to be read out next and the location information coincide with each other, and as a result of the determination, when they are determined not to coincide with each other, the data body b on the recording medium for distribution α which the address value indicates is read out, while when they are determined to coincide with each other, the omitted data on the memory section 125 is read out.

While the piece data d consists of the omitted data body and the location information, whether or not the location information is contained is arbitrary. In this case, for example, omitted location information indicating the omitted part is in advance recorded before the omitted part of the data body b, and the data body b is reproduced, and further counting is performed from the starting location information to the omitted location information. When this counting is finished, the omitted data on the memory section 125 may be reproduced as the data of the relevant omitted part. Alternatively, a location of the omitted part of the data body b is predetermined, and the location information of the omitted data is prepared in the reproduction software. It is possible that the data body b is reproduced and that at the same time, the omitted part of the data body b is recognized based on this location information and that the omitted data on the memory section 125 is reproduced as the data of the relevant omitted part.

Thus, the contents of the reproduction software are only one example, and any modification in design can be made as long as similar contents can be realized. It is true of the interruption program for user registration, the interruption program for reproduction software download, and the interruption program for piece data delivery.

In the first embodiment, the system can also be changed in design so as to prevent illegal use of a contents file on the recording medium for distribution α not delivered on a rental basis but transferred to the user for pay or for free. In this case, advantages similar to the foregoing are also brought about. In the contents of the reproduction software used in this case, only the series of processings when the contents file is inside and outside of the rental period are deleted. With respect to the digital contents reproducing device, the reproduction software may not be downloaded from the management center 110, but may be installed through a recording medium such as CD. Furthermore, obviously, the digital contents reproducing device is not a computer but can be a dedicated device, and any configuration can be used as long as the digital contents reproducing device has the function in which when a reproduction application for a contents file under the condition of authentication and billing is inputted by a user, the relevant application is transmitted to the management center 110 via the communication line β and thereafter when the piece data d is transmitted from the management center 110 via the communication line β, the data body b on the recording medium for distribution α is reproduced by using the header information on the recording medium for distribution α and the relevant piece data d at the time of reproducing operation.

Embodiment 2

Figure 6:
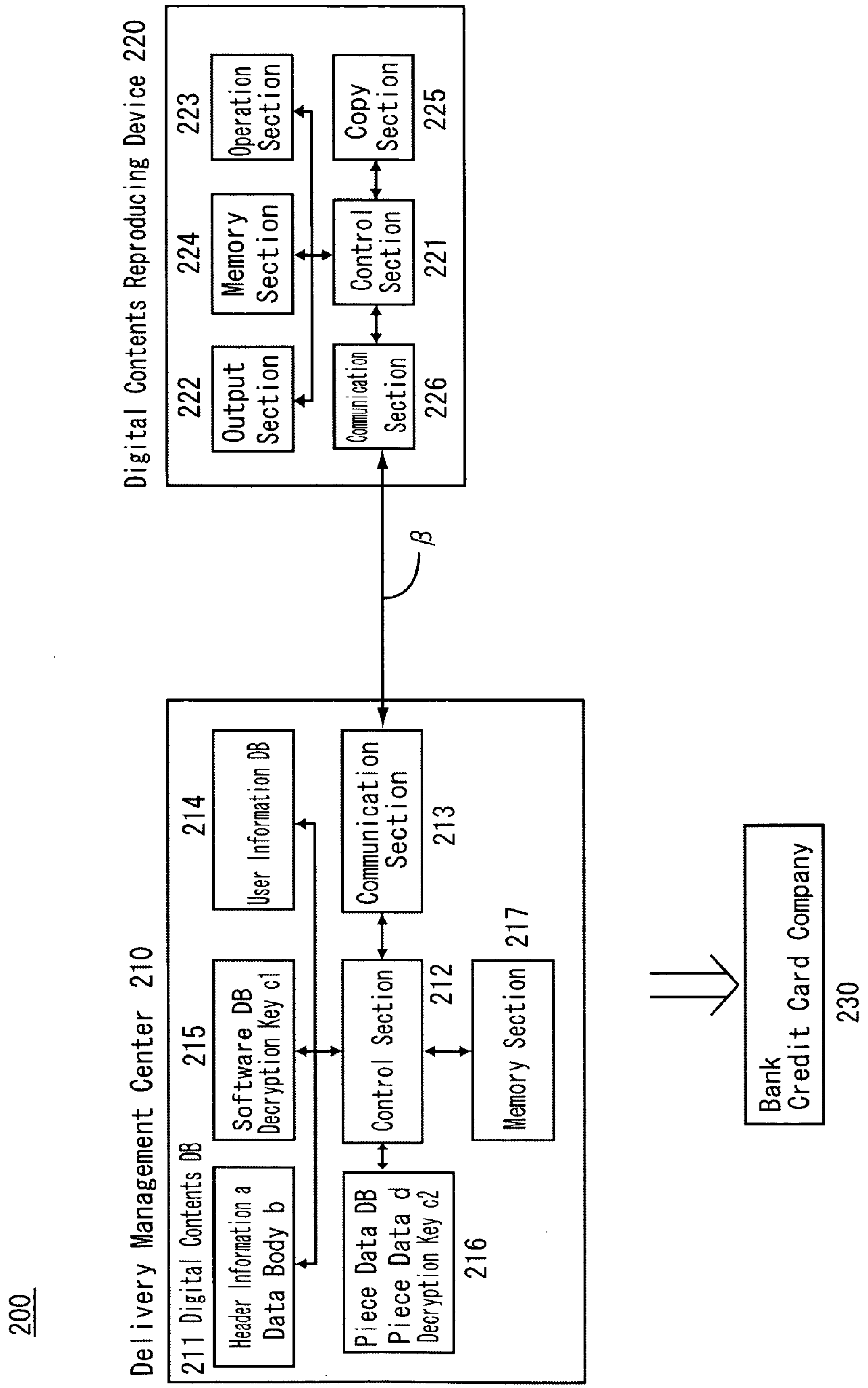
FIG. 6 is a configuration diagram of a digital contents illegal use preventing system according to a second embodiment of the present invention.
Figure 8:
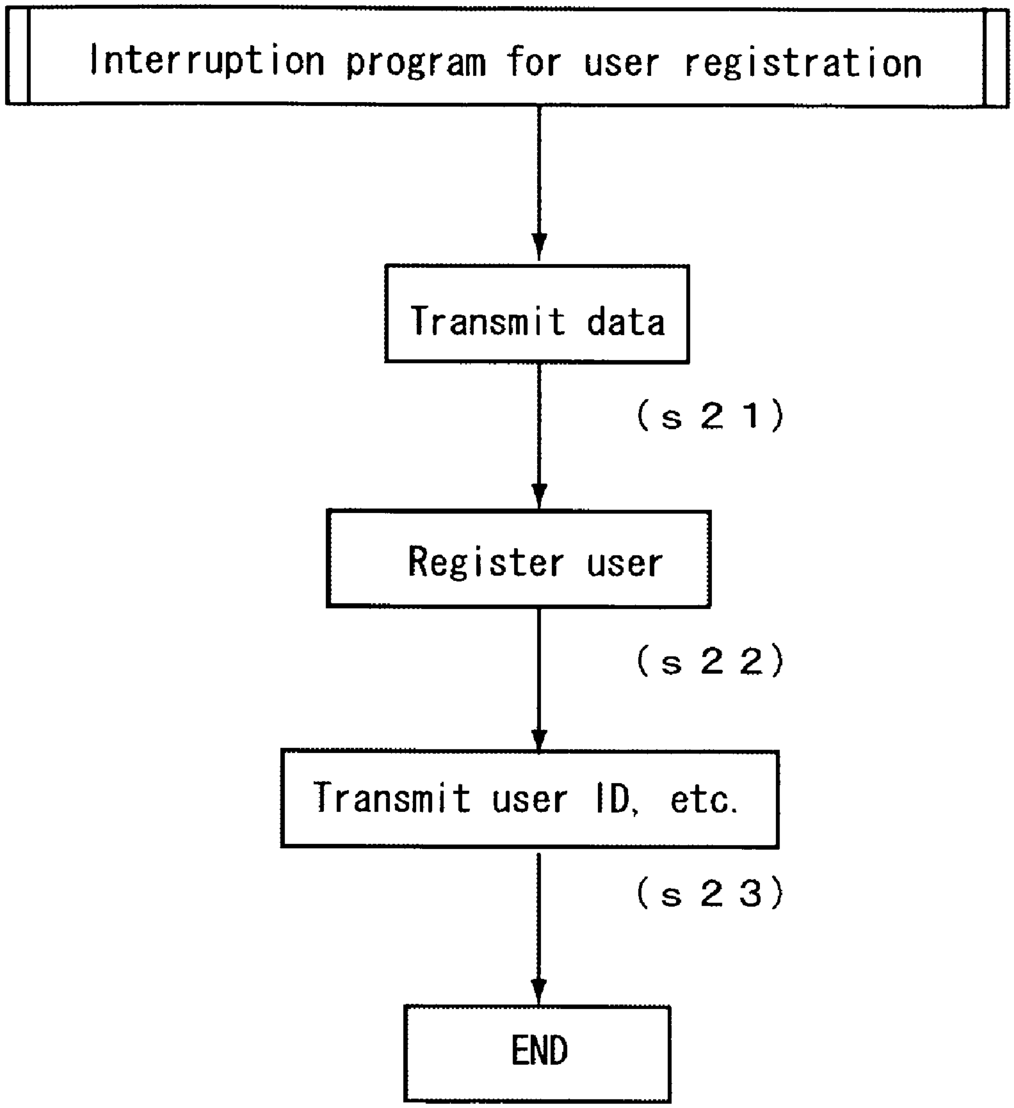
FIG. 8 is a flowchart of an interruption program for user registration which is processed by a control section in a delivery management center of this system.
Figure 9:
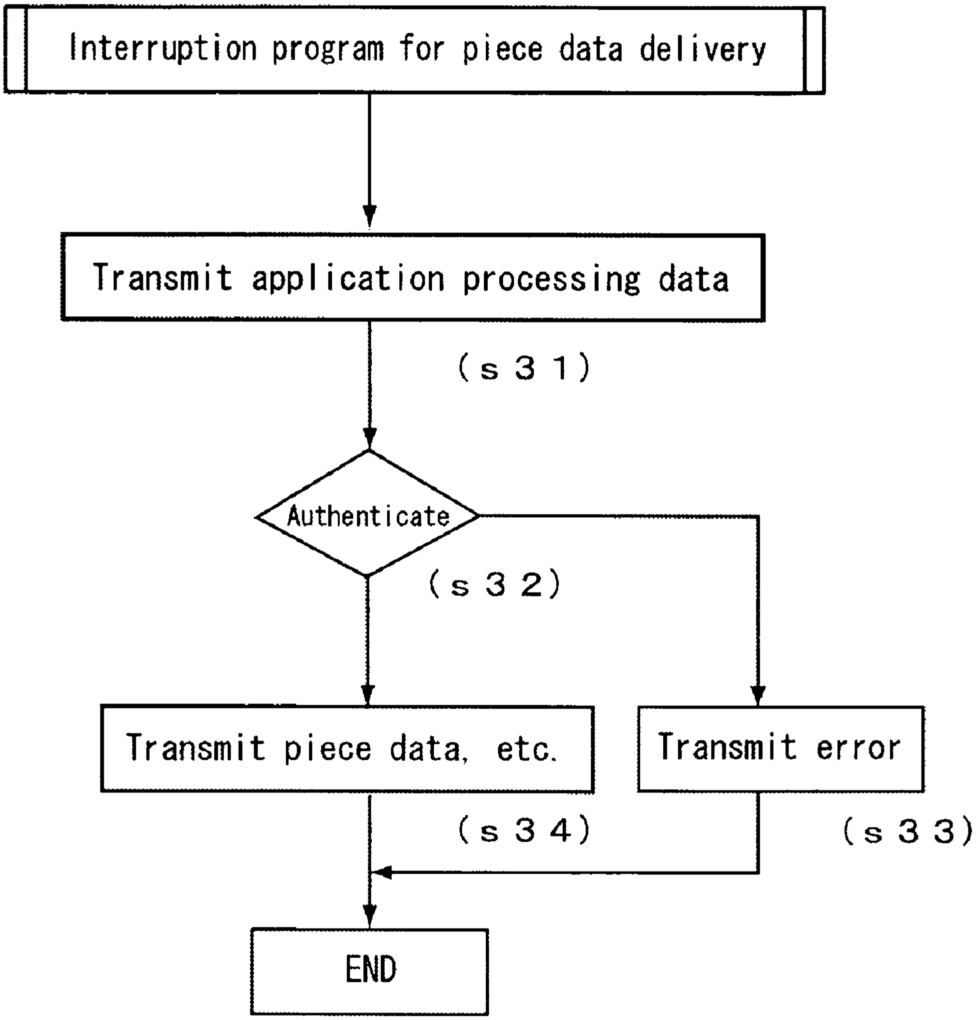
FIG. 9 shows an interruption program for piece data delivery which is processed by the control section in the delivery management center of this system.

Next, a second embodiment of the present invention is described with reference to the drawings. FIG. 6 is a configuration diagram of a digital contents illegal use preventing system, FIG. 7 is a flowchart of reproduction software used for this system, FIG. 8 is a flowchart of an interruption program for user registration which is processed by a control section in a delivery management center of this system, and FIG. 9 shows an interruption program for piece data delivery which is processed by the control section in the delivery management center of this system.

Figure 7:
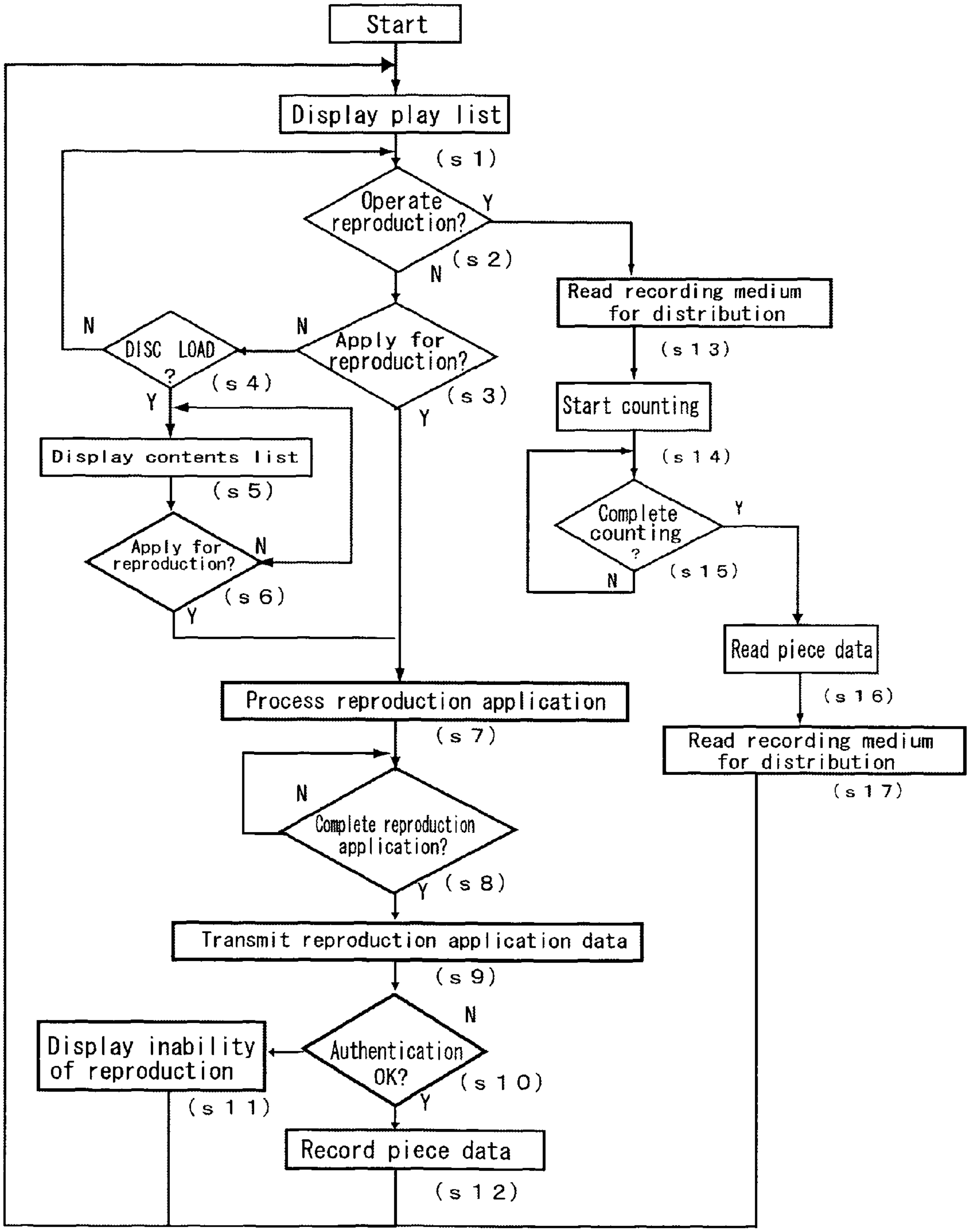
FIG. 7 is a flowchart of reproduction software used for this system.

A digital contents (data) illegal use preventing system 200 as shown in FIG. 7 is a system preventing a contents file delivered to a user for a rental purpose from being used illegally.

This system has a configuration comprising a delivery management center 210 (electronic equipment) which is a server in which a contents file having the header information a and the data body b is prepared in advance with the header information a and with part of the data body b omitted, and the piece data d consisting of omitted data and location information indicating in which part of the data body b the relevant omitted data is located is prepared in advance separately from the relevant contents file, the delivery management center 210 functioning as delivery management means for delivering the relevant contents file via a communication line β (as in Embodiment 1) and meanwhile, managing the utilization of the relevant data body b, and a digital contents reproducing device 220 (data reading device) which can intercommunicate with the delivery management center 210 via the communication line β and is used when the contents file delivered from the delivery management center 210 is reproduced and copied.

The contents file has the data body b which is data of music, moving image, static image, text, game, software or the like, and the header information a containing reproduction information for reproducing this data body b and contents information such as a contents ID assigned to this data body b and WEB address information of the delivery management center 210, and after the header information a and the data body b are encrypted, respectively, the contents file obtains a data structure in which part of the relevant data body b is omitted. At the beginning of the data body b, starting location information indicating a starting location of the relevant data body b is recorded. The location information indicating in which part of the data body b the omitted data is located is a data length or a time from the starting location information to the omitted part.

The delivery management center 210 is a server operated by a person doing a business in which the content file is rented to a user and a rental fee is collected from the user under an agreement between the user and an owner of copyright or the like of a copyrighted work contained in the data body b of the contents file to be delivered. In the figure, reference numeral 211 denotes a digital contents DB (an auxiliary memory device) on which the contents file having the header information a and the data body b is in advance recorded with part of the data body b omitted, reference numeral 212 denotes a control section such as a computer, reference numeral 213 denotes a communication section for performing communication, reference numeral 214 denotes a user information DB on which user information is recorded and information such as authentication and billing based on the user information is recorded sequentially, reference numeral 215 denote a software DB on which the reproduction software and a decryption key c1 necessary for decrypting the header information a of the contents file are recorded in advance, reference numeral 216 denotes a piece data DB on which the piece data d and the decryption key c2 necessary for decrypting the data body b of the contents file are recorded in advance, and reference numeral 217 denotes a memory section such as a hard disk.

On the memory section 217, in addition to basic programs such as an operation system as a server, an interruption program for user registration as shown in FIG. 8, an interruption program for reproduction software download not shown in the figure, an interruption program for contents download not shown in the figure, an interruption program for piece data delivery as shown in FIG. 9 and the like are recorded. The contents of these programs will be described later. By processing these programs in the control section 212, this server exerts a function as the delivery management center. Furthermore, on the memory section 217, data necessary for user registration processing and data necessary for reproduction application processing are recorded.

The contents ID indicating the corresponding contents file is added to the piece data d on the piece data DB 216. Thus, by using the contents ID, a correspondence relationship between the contents file and the piece data d on the piece data DB 216 coincides. Similarly, a user ID and a player ID of a corresponding user are added to the user information on the user information DB 214. Thus, by using the user ID or the player ID, a correspondence relationship between the user and the user information in the user information DB 214 coincides.

Since the delivery management center 210 confirms (namely, authenticates) the user ID and a password and in addition, confirms whether or not the player ID coincides before transmitting the piece data d to the digital contents reproducing device 220, the player ID is also useful for preventing illegal use.

The digital contents reproducing device 220 is a general-purpose computer used by the user. In the figure, reference numeral 221 denotes a control section such as CPU, reference numeral 222 denote an output section such as a monitor and a speaker, reference numeral 223 denotes an operation section such as a keyboard and a mouse, reference numeral 224 denotes a memory section such as a hard disk, reference numeral 225 denotes a reproduction and copy section reading/writing the data with respect to the recording medium or the like, and reference numeral 226 denotes a communication section for performing communication.

On the memory section 224, in addition to basic programs such as operation system as a computer, the reproduction software as shown in FIG. 7 is recorded. This reproduction software is chargeable or free software downloaded through the communication line β from the delivery management center 210 under the condition of user registration, and application software necessary for reproducing the contents file. Furthermore, the information of a WEB address of the delivery management center 210 in which the player ID assigned to the reproduction software and the piece data d are stored is transmitted from the delivery management center 210 to the memory section 224 together with the relevant reproduction software and is stored therein. Further, on the memory section 224, the piece data d, the decryption keys c1, c2 and the like which have been transmitted from the delivery management center 210 are recorded, and rental information indicating a rental period and the like is recorded.

The contents of the reproduction software will be described later. The processing of this reproduction software by the control section 221 as shown in FIG. 7 allows this computer to exert the function as the digital contents reproducing device 220.

The operation of the digital contents illegal use preventing system 200 configured as described above is described and in conjunction with this, the operation of the digital contents reproducing device 220, the operation of the delivery management center 210, and the contents of the respective programs are described.

The user operates the operation section 223 of his or her own computer (computer equivalent to the digital contents reproducing device 220, which is in a state that the reproduction software is not downloaded) to access the delivery management center 210 via the communication line β to request user registration. The delivery management center 210 processes the interruption program for user registration as shown in FIG. 8 in accordance with this request, and transmits the data necessary for the user registration to the computer (s21). Thereafter, the user inputs his or her name, address and payment condition, "a bank account number or a credit card number of his or hers, etc." as displayed in a user registration screen through the operation section 223 of the computer and transmits this registration data to the delivery management center 210 via the communication line β. Then, the delivery management center 210 creates the user ID and the password in accordance with this to register the relevant user ID and the like to the user information DB 214 together with the registration data as user information (s22). On the other hand, the relevant user ID and password are transmitted to the computer of the user via the communication line β (s23). Then, the processing of the interruption program for user registration is finished. The user ID and the password may be inputted by the user himself or herself at the time of user registration.

Thereafter, the user operates his or her computer to access the delivery management center 210 and inputs a request for the download of the reproduction software. At this time, the user ID and the password are required. Then, the computer of the user transmits the request to the delivery management center 210 via the communication line β. The delivery management center 210 processes the interruption program for reproduction software download in accordance with this request, reads out the reproduction software and the decryption key c1 on the software DB 215, and transmits them to the computer of the user via the communication line β. Then, the reproduction software is downloaded to the memory section 224 of the computer and installed. At the same time, the decryption key c1 is recorded on the memory section 224. This makes the computer into the digital contents reproducing device 220.

Next, in order to acquire the contents file, the digital contents reproducing device 220 accesses a contents download address of the delivery management center 210 in accordance with the operation through the user operation section 223 of the user. Then, the delivery management center 210 processes the interruption program for contents download. The data of a contents file list is transmitted to the digital contents reproducing device 220. The digital contents reproducing device 220 outputs and display the contents file list on the output section 222 based on this data. In order to access the delivery management center 210, after the reproduction software is executed, the delivery management center 210 may be accessed based on the WEB address recorded together with the relevant software, or may be accessed based on the WEB address that the user has registered in an internet browser.

Thereafter, the user selects the contents file to download from the contents file list through the operation section 223.

The data of application for downloading the selected contents file is transmitted to the delivery management center 210.

Upon receiving this application data, the delivery management center 210, with reference to the contents ID contained in the application data, searches for the contents file corresponding to the relevant contents ID from the digital contents DB 211, and reads out and transmits it to the digital contents reproducing device 220. Upon receiving the relevant contents file, the digital contents reproducing device 220 records it on a registry of the memory section 224 or the recording medium set in the reproduction and copy section 225. At the same time, a file name of the relevant contents file is recorded on a play list of the reproduction software on the memory section 224. In this manner, the contents file is acquired. The download of the contents file may be acquired by another computer connected to the delivery management center 210 via the communication line β to record it on a recording medium.

Thereafter, when the user performs execution operation of the reproduction software with respect to this digital contents reproducing device 220 (in the case where the contents file is recorded on the recording medium, the execution operation of the reproduction software is performed, while the relevant recording medium is set in the reproduction and copy section 225), the data of a reproduction player and the play list contained in the relevant reproduction software is outputted and displayed on the output section 222. Then, the play list is displayed on a screen of the reproducing player (s1). This play list shows a file name of the downloaded contents file and whether or not the relevant contents file is being rented. That is, the contents file with a predetermined flag hoisted, which indicates that a reproduction application has been made, is displayed as the one being rented. Based on this play list, it is determined whether or not the reproducing operation of the contents file being rented has been performed through the operation section 223 (s2).

If it is determined that the reproducing operation has not been performed, then it is determined whether or not the application operation for reproduction of the contents file not being rented which is displayed on the play list has been performed through the operation section 223 (s3). As a result, if it is determined that the application operation for reproduction has not been performed, then it is determined whether or not reading operation of the recording medium (operation of DISC LOAD) has been performed through the operation section 223 (s4). When the operation of DISC LOAD is performed, the contents list indicating a contents file on the recording medium which is not recorded on the play list (that is, downloaded on the recording medium with another computer or the like) is outputted and displayed (s5) on the output section 222. Namely, while the decryption key c1 on the memory section 225 is read out, the header information a of the contents file on the recording medium is read out and by using the relevant decryption key c1, the header information a is decrypted to read out the contents information contained in the relevant header information a, and the contents file with the predetermined flag not hoisted among the contents files on the recording medium is displayed on the contents list.

Thereafter, when an application for reproduction of the contents file not being rented on the play list or the contents file on the contents list is performed by the user (s3 or s6), the decryption key c1 on the memory section 224 is read out, while the header information a of the relevant contents file on the memory section 224 or on the recording medium is read out and decrypted by using the relevant decryption key c1, and based on the WEB address of the contents information contained in this, the contents ID contained in the relevant header information a is transmitted to the delivery management center 210 via the communication line β. In this manner, the execution of the reproduction application processing is transmitted.

Then, the delivery management center 210 processes the interruption program for piece data delivery as shown in FIG. 9, and transmits the data necessary for the reproduction application processing to the digital contents reproducing device 220 via the communication line β (s31). Based on this data, the digital contents reproducing device 220 outputs and displays a reproduction application screen on the output section 222 (s7).

Thereafter, when the user sequentially inputs or selects a rental period through the operation section 223 as displayed on the reproduction application screen (this automatically determines a rental amount of money), and finally inputs the user ID and the password through the operation section 223 as the reproduction application of the contents file (s8), the digital contents reproducing device 220 shifts the display output of the output section 222 to an authentication screen, while the inputted application data is transmitted to the delivery management center 210 via the communication line β. At this time, the contents ID of the contents information on the memory section 224 or on the recording medium and the player ID on the relevant memory section 224 are read out and transmitted to the delivery management center 210 together with the application data (s9).

The delivery management center 210 confirms the authentication of the user relating to the application (s32). Namely, with reference to the transmitted user ID and player ID of the user, etc., the user information of the relevant user is read out from the user information DB 214, and whether or not the relevant user is an authentic user is confirmed. At this time, the delivery management center 210 has in advance prepared a list of inappropriate persons with nonpayments of rental fee more than or equal to predetermined times or the like in the user information DB 214, and in addition to the authentication, confirms whether or not the user falls under the list of inappropriate persons (this confirmation of the list of inappropriate persons is arbitrary).

In the case where the delivery management center 210 has confirmed that the user relating to the application is an unauthentic user or an authentic user but a person who falls under the list of inappropriate persons, the rejection of the application of the user is transmitted to the digital contents reproducing device 220 via the communication line β (s33). Then, the interruption program for piece data delivery is finished.

On the other hand, in the case where it has been confirmed that the user relating to the application is an authentic user and a person who does not fall under the list of inappropriate persons, with reference to the player ID of the user or the like, accounting is recorded on the user information of the user on the user information DB 214, while with reference to the contents ID, the piece data DB 216 is searched to read out the piece data d and the decryption key c2 corresponding to the relevant contents ID and to transmit them to the digital contents reproducing device 220 as a reply indicating that the application of the user is accepted together with the rental information contained in this reproduction application data via the communication line β (s34). Then, the processing of the interrupt program for piece data delivery is finished.

The charge is charged to a bank/credit card company 230 or charged directly to the user, based on the user information DB 214 for every predetermined period and the user transfers the charge to an account or pays it in a convenience store or the like. Furthermore, in the case where the delivery management center 210 is connected to the bank/credit card company 230 via the communication line β, it is obviously possible to immediately settle accounts, too.

Thereafter, upon receiving the rejection of the application of the user via the communication line β (s10), the digital contents reproducing device 220 outputs and displays an error message to the output section 222 (s11).

On the other hand, when the piece data d and the decryption key c2, and the rental information are received via the communication line β (s10), the predetermined flag is hoisted, while the piece data d, the decryption key c2 and the rental information are recorded on the memory section 224 (s12). At the same time, by using a clock function of the computer, a piece data transmission date and time is recorded on the memory section 224. Then, the play list is updated, and outputted and displayed on the output section 222, so that a file name of the contents file with the piece data d obtained is displayed on the relevant play list (s1).

Thereafter, when the reproducing operation of the contents file being rented is performed based on the play list through the operation section 223 (s2), the digital contents reproducing device 220 reads out the decryption key c1 from the memory section 224, and meanwhile, it reads out the header information a of the contents file on the memory section 224 or on the recording medium and decrypts the header information a by using the decryption key c1. Then, the data body b on the memory section 224 or on the recording medium is read out by using the reproduction information contained in the relevant header information a and is reproduced while being decrypted with the decryption key c2 on the memory section 224 (s13). In addition, while the starting location information of the data body b on the memory section 224 or on the recording medium is read out, the piece data d on the memory section 224 is read out and the counting of a data length or a time from the starting location information to the location information contained in the piece data d is started (s14). Thereafter, whether or not the counting is finished is determined (s15). Thereby, the omitted part of the data body b is recognized. As a result of this determination, when it is determined that the counting is finished and the omitted part of the data body b is recognized, the piece data d on the memory section 224 is read out and the omitted data contained in the relevant piece data d is read out as the data of the omitted part of the relevant data body b and is reproduced while being decrypted with the decryption key c2 on the memory section 224 (s16). Then, the data body b on the memory section 224 or on the recording medium is read out again and is subsequently reproduced while being decrypted with the decryption key c2 on the memory section 224 (s17). This reproduction software program is finished upon end processing by the user.

Furthermore, the reproduction software, in addition to the above-described basic function, has a piece data management function which is resident in the relevant digital contents reproducing device 220 to manage the piece data d when the digital contents reproducing device 220 is turned ON. This piece data management function manages the piece data d on the memory section 224, While it obtains a difference between a piece data transmission data and time and a current date and time as an elapsed period from a time point when the piece data d is transmitted, and when this reaches the rental period contained in the rental information, it is determined to be outside of the rental period and the piece data d and the decryption key c2 on the memory section 224 are deleted, and the predetermined flag is hauled down.

Thus, in this system 200, even when the user operates to reproduce the contents file by using the digital contents reproducing device 220, the data body b of the contents file cannot be reproduced unless the user obtains the piece data d from the delivery management center 210 as an authentic reproduction applicant. Accordingly, the temporary, illegal use of the contents can be prevented. In addition, with respect to the contents file whose rental period has passed, the piece data d is deleted, which can also prevent secondary illegal use. Furthermore, even if the contents file is copied to another recording medium by the user, since in the contents file recorded on this recording medium, the reproduction information contained in the header information a is omitted, the contents file cannot be reproduced unless the user obtains the piece data d as an authentic reproduction user. Therefore, tertiary, illegal use can also be prevented.

Furthermore, outside of the rental period of the digital contents, only the piece data d or the like on the memory section 224 is deleted automatically, and the contents file remains as it is. Thus, inside and outside of the rental period, the contents file can be copied to another recording medium by using the digital contents reproducing device 220. In order to reproduce such a contents file on the recording medium, authentication to the delivery management center 210 and payment of rental fee by using the digital contents reproducing device 220 are required, so that the collection of charge in accordance with the secondary and tertiary use can be ensured.

Moreover, in this system, since the contents file can be easily recorded on the recording medium by using computer having a write function as described above, a rental video shop or the like can employ a form of setting up the relevant computer instead of displaying recording media such as video tapes, CD and DVD. This makes it unnecessary to return the recording medium, which brings advantages to both the agency and customers. In addition, since a shop clerk does not know what contents file a customer downloads, some kinds of digital contents become easy to rent. In this case, it goes without saying that a form of a rental video shop need not be employed but a form of a service by an internet cafe can be employed. The contents DB may be set up in the rental video shop or the internet cafe.

This illegal use preventing system 200 may be subject to any design modification as long as it comprises delivery management means which is a server having a first database on which a contents file with a header information and a data body is recorded with part of the relevant data body omitted and a second database on which this omitted data and location information indicating in which part of the data body the relevant omitted data is located is recorded, and which can deliver the relevant contents file via a communication line, and meanwhile manages the utilization of the relevant contents file, and a digital contents reproducing device which can intercommunicate with this delivery management means via the communication line, and which is used in reproducing the contents file delivered from the delivery management means, wherein when a request for download of the contents file is inputted to the digital contents reproducing device by a user, the digital contents reproducing device transmits the relevant request to the delivery management means via the communication line, the delivery management means transmits the contents file relating to the relevant request to the digital contents reproducing device via the communication line, and the digital contents reproducing device receives the relevant contents file to record it on the memory section or on the recording medium, while when an application for reproduction of the contents file is inputted to the digital contents reproducing device by the user, the digital contents reproducing device transmits the relevant application to the delivery management means via the communication line, the delivery management means transmits omitted data and its location information of the contents file relating to the relevant application simultaneously or sequentially to the digital contents reproducing device via the communication line, and the digital contents reproducing device receives the relevant omitted data and its location information simultaneously or subsequently to record it on the memory section and reads out the data body of the contents file on the memory section or on the recording medium to reproduce it, and at the same time, the digital contents reproducing device recognizes the omitted part of the data body with reference to the location information read out from the memory section, and reads out and reproduces the omitted data on the memory section as the data of the relevant omitted part.

Therefore, although the delivery management center 210 is designed to have one digital contents DB 211, it may have a plurality of digital contents DBs. In this case, the design may be such that different kinds of contents file groups are stored in the respective DBs, for example, contents files of movie are stored in a first DB and content files of music are stored in a second DB, or such that the contents file groups stored in the respective DBs are the same and the concentration of access on a first DB during busy hours is prevented. It is true of the piece data DB 216. Furthermore, although the delivery management center 210 is designed to have the digital contents DB 211 and the piece data DB 216, the digital contents DB 211 and the piece data DB 216 can also be set up in a different place from the delivery management center 210. In this case, the delivery management center 210 may authenticate the user and transmit a WEB address of the digital contents DB 211 and the piece data DB 216 to the digital contents reproducing device 220, and the digital contents reproducing device 220 may access the digital contents DB 211 and the piece data DB 216 based on the relevant WEB address to obtain the contents file and the piece data d.

Furthermore, although the digital contents DB 211 has the header information a and the data body b recorded in an encrypted state, respectively, it is arbitrary whether or not the encryption is performed. However, it is desirable that at least the data body b is encrypted. Furthermore, while the contents file is structured to have the header information a and the data body b, it is obviously possible to record the contents file with other information added thereto. Other information includes a program by which it is determined whether or not the reproduction software has been installed in the computer of the user, and when it is determined that the reproduction software has not been installed, HP of the delivery management center 210 is automatically accessed, and the like. When this program has been recorded and the user attempts to execute the contents file which he or she has in advance obtained in his or her computer (computer equivalent to the digital contents reproducing device 220, which is in a state that the reproduction software is not downloaded), the WEB address of the delivery management center 210 is read out, and based on this, the delivery management center 210 is automatically accessed. Thereafter, the reproduction software can be obtained by the above-described procedure. Although the contents file is designed such that a part thereof is omitted, it can be obviously designed such that a plurality of points are omitted.

While the location information is designed to be a data length or a time from the starting location information to the omitted part, it may be an address value indicating the omitted part or the like. In this case, it is sequentially determined whether or not an address value of the data body b on the recording medium for distribution α to be read out next and the location information coincide with each other and as a result of the determination, when they are determined not to coincide with each other, the data body b on the memory section 224 or on the recording medium which the address value indicates is read out, while when they are determined to coincide with each other, the omitted data on the memory section 224 is read out.

While the piece data d consists of the omitted data body and the location information, whether or not the location information is contained is arbitrary. In this case, for example, omitted location information indicating the omitted part is in advance recorded before the omitted part of the data body b, and the data body b is reproduced, and further counting is performed from the starting location information to the omitted location information. When this counting is finished, the omitted data on the memory section 224 may be reproduced as the data of the relevant omitted part. Alternatively, a location of the omitted part of the data body b is predetermined, and the location information of the omitted data is prepared in the reproduction software. It is possible that the data body b is reproduced and that at the same time, the omitted part of the data body b is recognized based on this location information to reproduce the omitted data on the memory section 224 as the data of the relevant omitted part.

Thus, the contents of the reproduction software are only one example, and any modification in design can be made as long as similar contents can be realized. It is true of the interruption program for user registration, the interruption program for reproduction software download, and the interruption program for piece data delivery.

Furthermore, in the case where the contents file is recorded on the memory section 224 of the digital contents reproducing device 220, after the rental period has passed, the contents file may be deleted together with the piece data d, or separately from the piece data d, an elapsed time from a point of time when the contents file is received is obtained and when the relevant elapsed time reaches a predetermined period, the relevant contents file may be deleted.

In the second embodiment, the system can also be changed in design so as to prevent illegal use of a contents file which is not delivered on a rental basis but transferred for pay or for free. In this case, advantages similar to the foregoing are also brought about. In the contents of the reproduction software used in this case, only the processing when the delivered contents file is outside of the rental period is deleted. Furthermore, as for the digital contents reproducing device 220, the reproduction software may not be downloaded from the delivery management center 210, but may be installed through a recording medium such as CD. Furthermore, obviously, the digital contents reproducing device 220 is not a computer but can be a dedicated device.

Embodiment 3

Figure 10:
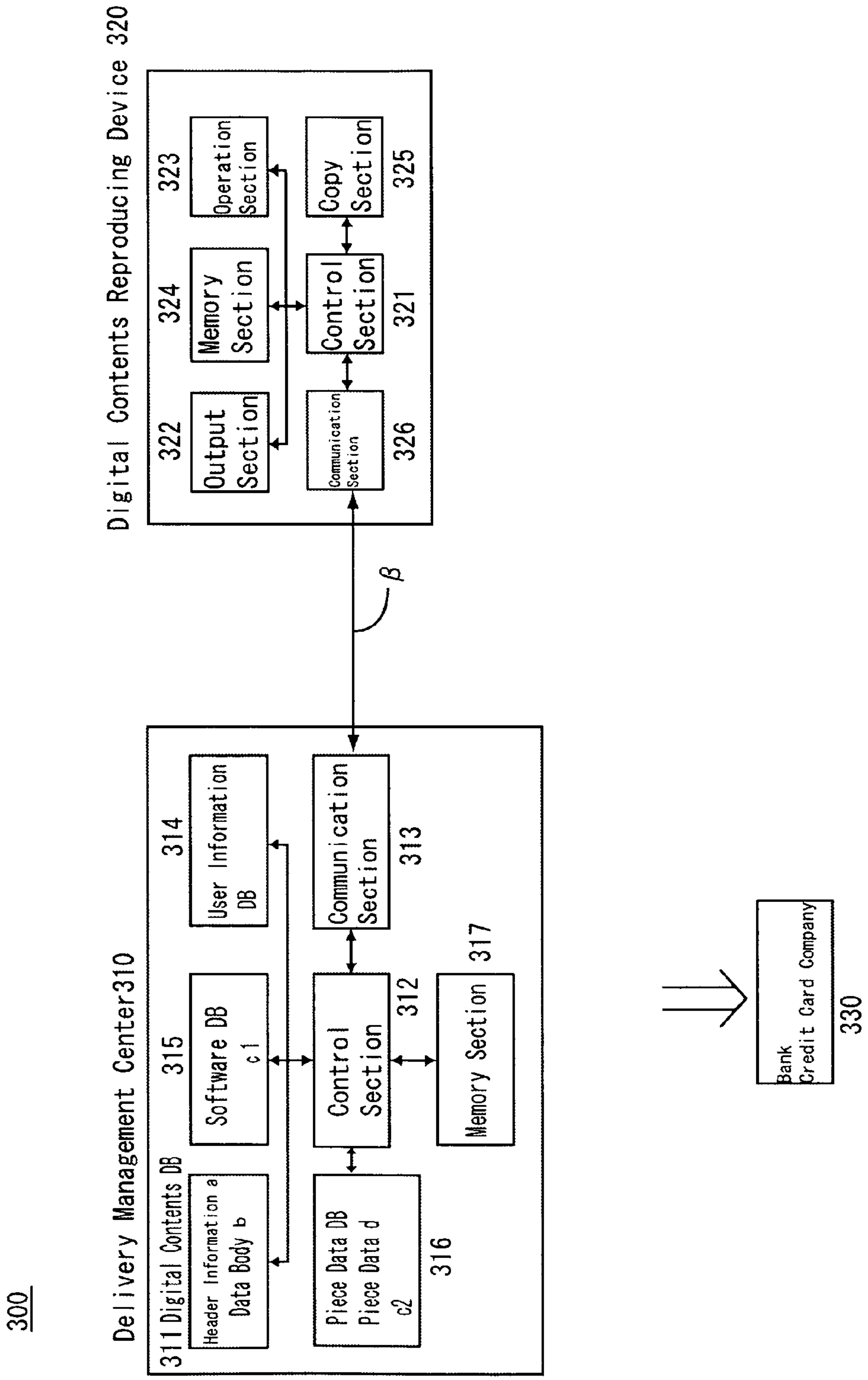
FIG. 10 is a configuration diagram of a digital contents illegal use preventing system according to a third embodiment of the present invention.
Figure 11:
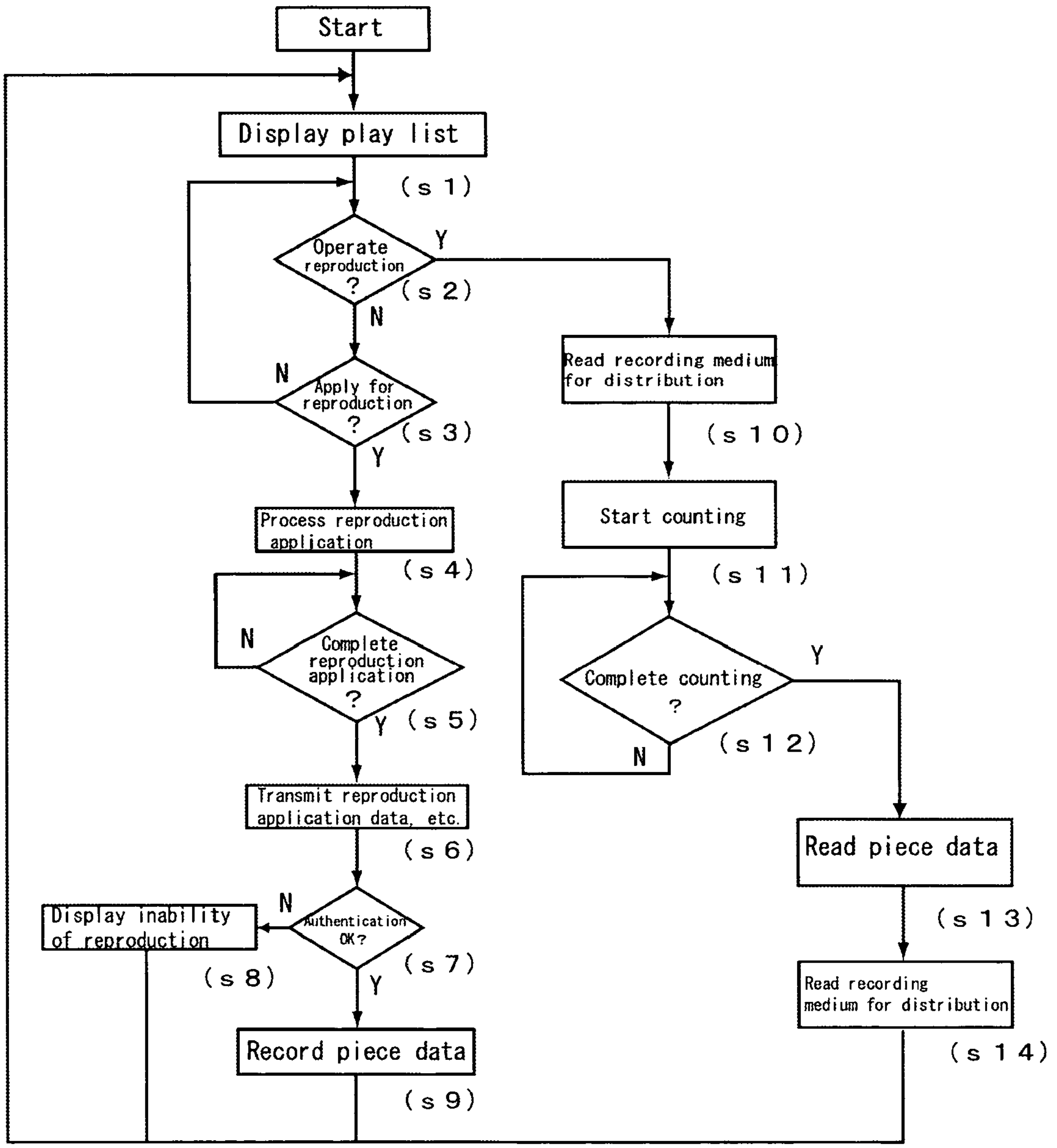
FIG. 11 is a flowchart of reproduction software used for the digital contents illegal use preventing system.
Figure 12:
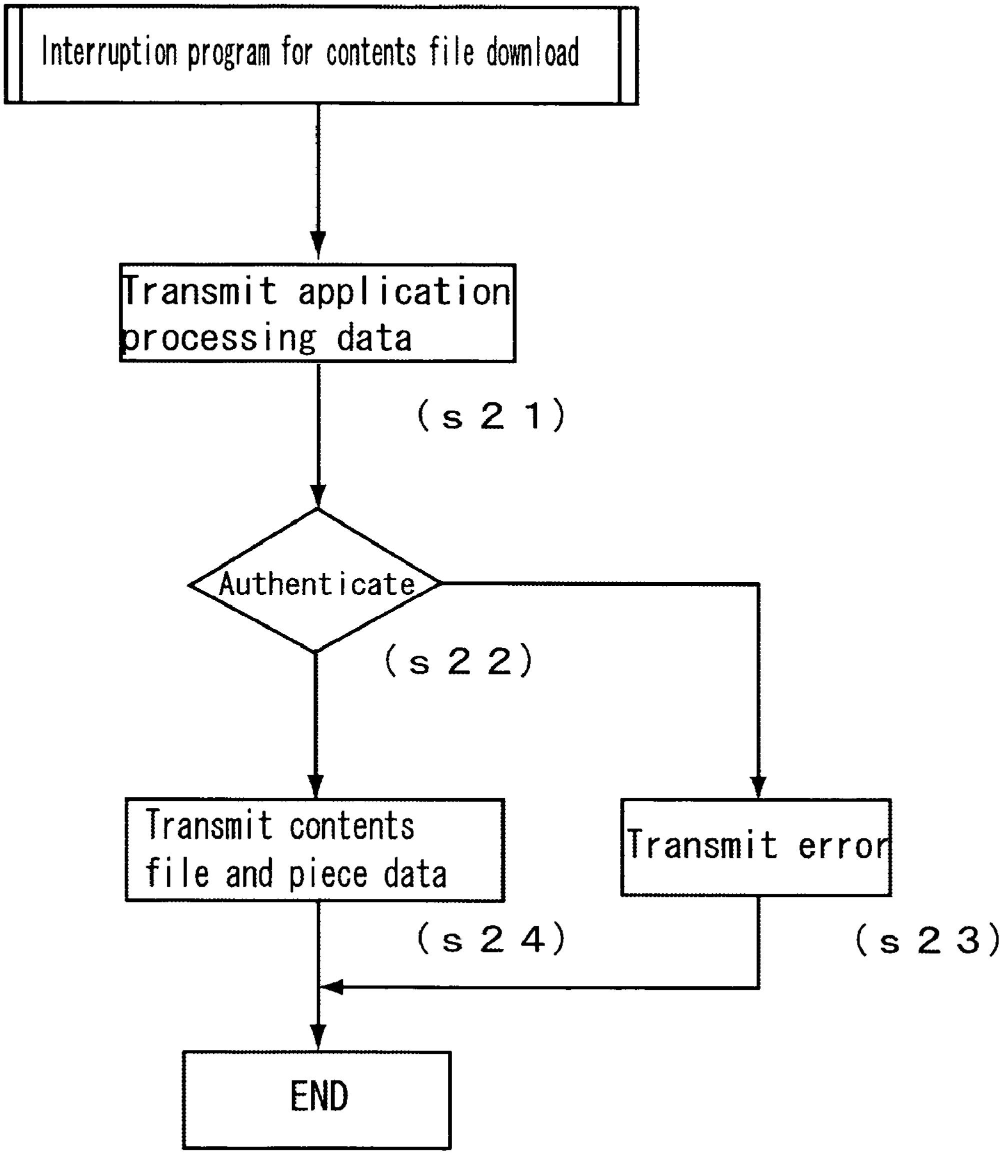
FIG. 12 is a flowchart of an interruption program for contents download.

Next, a third embodiment of the present invention is described with reference to the drawings. FIG. 10 is a configuration diagram of a digital contents illegal use preventing system relating to the third embodiment of the present invention, FIG. 11 is a flowchart of reproduction software used for the digital contents illegal use preventing system, and FIG. 12 is a flowchart of an interruption program for contents download.

A digital contents illegal use preventing system 300 as shown in FIG. 10 has the same configuration as that of the illegal use preventing system 200. Different points are the contents of reproduction software recorded on a memory section 324 of a digital contents reproducing device 320 (refer to FIG. 11) and the contents of the interruption program for contents download recorded on a memory section 317 of a delivery management center 310 (refer to FIG. 12). Hereinafter, the different points are described in detail, and a description of overlapping parts is omitted.

The reproduction software is downloaded to the digital contents reproducing device 320 and recorded on the memory section 324 by procedure similar to that of Embodiment 2.

Next, in order to acquire a contents file, the digital contents reproducing device 320 accesses a contents download address of the delivery management center 310 in accordance with the operation through a user operation section 323 of the user. Then, the delivery management center 310 processes the interruption program for contents download as shown in FIG. 12. The data of a contents file list necessary for rental application processing and the like are transmitted to the digital contents reproducing device 320 via the communication line β (s21). The digital contents reproducing device 320 outputs and displays a rental application screen on an output section 322 based on this data.

Thereafter, when the user sequentially inputs or selects the contents file and a rental period thereof through the operation section 323 as displayed on the reproduction application screen (this automatically determines a rental amount of money), and finally inputs a user ID and a password through the operation section 323 as a rental application of the contents file, the digital contents reproducing device 320 shifts the display output of the output section 322 to an authentication screen, while the inputted application data is transmitted to the delivery management center 310 via the communication line β. At this time, a player ID on the memory section 324 is read out and transmitted to the delivery management center 310 together with the application data.

The delivery management center 310 confirms the authentication of the user relating to the application (s22). Namely, with reference to the transmitted user ID and player ID of the user, etc., the user information of the relevant user is read out from a user information DB 314, and whether or not the relevant user is an authentic user is confirmed. At this time, the delivery management center 310 has in advance prepared a list of inappropriate persons with nonpayments of rental fee more than or equal to predetermined times or the like in the user information DB 314, and in addition to the authentication, confirms whether or not the user falls under the list of inappropriate persons (this confirmation of the list of inappropriate persons is arbitrary).

In the case where the delivery management center 310 has confirmed that the user relating to the application is an unauthentic user or an authentic user but a person who falls under the list of inappropriate persons, the rejection of the application of the user is transmitted to the digital contents reproducing device 320 via the communication line β (s23).

On the other hand, in the case where it has been confirmed that the user relating to the application is an authentic user and a person who does not fall under the list of inappropriate persons, with reference to the contents ID, the selected contents file is searched and read out from a digital contents DB 311, while the piece data d and the decryption key c2 corresponding to the relevant contents ID are searched and read out from a piece data DB 316, and the contents file, the piece data d and the decryption key c2 are sequentially transmitted to the digital contents reproducing device 320 as a reply indicating that the application of the user is accepted together with the rental information via the communication line β (s24). Then, with reference to the player ID of the user and the like, accounting is recorded on the user information on the user information DB 314 of the relevant user.

The accounting is summed up based on the user information DB 314 for every predetermined period, and is charged to a bank/credit card company 330 or charged directly to the user, so that the user transfers the charge to an account or pays it in a convenience store or the like. Furthermore, in the case where the delivery management center 310 is connected to the bank/credit card company 330 via the communication line β, it is obviously possible to immediately settle accounts, too.

Thereafter, upon receiving the rejection of the application of the user via the communication line β, the digital contents reproducing device 320 outputs and displays an error message to the output section 322.

On the other hand, when the relevant contents file and the like are received via the communication line β, the relevant contents file is recorded on a registry of the memory section 324 or on a recording medium set in a copy section 325, while the piece data d, the decryption key c2 and the rental information are recorded on a predetermined registry for piece data different from the registry on which the contents file of the memory section 324 is recorded. At the same time, a file name of the relevant contents file is recorded on a play list of the reproduction software on the memory section 324. Then, a predetermined flag is hoisted.

Thereafter, when the user performs execution operation of the reproduction software (in the case where the contents file is recorded on the recording medium, the execution operation for the reproduction software is performed, while the relevant recording medium is set), the data of a reproduction player and the play list contained in the relevant reproduction software is outputted and displayed on the output section 322. Then, the play list is displayed on a screen of the reproduction software (s1). This play list shows a file name of the contents file and whether or not the relevant contents file is being rented. That is, the contents file with a predetermined flag hoisted is displayed as the one being rented. Based on this play list, it is determined whether or not the reproducing operation of the contents file being rented has been performed through the operation section 323 (s2).

If it is determined that the reproducing operation has not been performed, then it is determined whether or not the application operation of the contents file not being rented has been performed through the operation section 323 based on the play list (s3). Namely, it is determined whether or not the re-rental of the contents file whose rental period has been finished is applied for. As a result, if it is determined that the application for reproduction has been performed, then the decryption key c1 on the memory section 324 is read out, while the header information a of the relevant contents file on the memory section 324 or on the recording medium is read out and by using the relevant decryption key c1, the header information a is decrypted and based on a WEB address of the contents information contained in the relevant header information a, the contents ID is transmitted to the delivery management center 310 as a notice that the reproduction application processing is performed via the communication line β.

Then, the delivery management center 310 processes an interruption program for piece data delivery (refer to FIG. 9). Then, the delivery management center 310 transmits data necessary for the reproduction application processing to the digital contents reproducing device 320 via the communication line β (s31). Based on this data, the digital contents reproducing device 320 outputs and displays a reproduction application screen on the output section 322 (s4).

Thereafter, when the user sequentially inputs or selects a rental period through the operation section 323 as displayed on the reproduction application screen (this automatically determines a rental amount of money), and finally inputs the user ID and the password through the operation section 323 as the reproduction application of the contents file (s5), the digital contents reproducing device 320 shifts the display output of the output section 322 to an authentication screen, while the inputted application data is transmitted to the delivery management center 310 via the communication line β. At this time, the contents ID of the contents information on the memory section 324 or on the recording medium and the player ID on the memory section 324 are read out and transmitted to the delivery management center 310 together with the application data (s6).

The delivery management center 310 confirms the authentication of the user relating to the application (s32). Namely, with reference to the transmitted user ID and player ID of the user, etc., the user information of the relevant user is read out from the user information DB 314, and whether or not the relevant user is an authentic user is confirmed. At this time, the delivery management center 310 has in advance prepared a list of inappropriate persons with nonpayments of rental fee more than or equal to predetermined times or the like in the user information DB 314, and in addition to the authentication, confirms whether or not the user falls under the list of inappropriate persons (this confirmation of the list of inappropriate persons is arbitrary).

In the case where the delivery management center 310 has confirmed that the user relating to the application is an unauthentic user or an authentic user but a person who falls under the list of inappropriate persons, the rejection of the application of the user is transmitted to the digital contents reproducing device 320 via the communication line β (s33). Then, the interruption program for piece data delivery is finished.

On the other hand, in the case where it has been confirmed that the user relating to the application is an authentic user and a person who does not fall under the list of inappropriate persons, with reference to the player ID of the user or the like, accounting is recorded on the user information of the user on the user information DB 314, while the piece data DB 316 is searched to read out the piece data d and the decryption key c2 corresponding to the above-mentioned contents ID, and to transmit them to the digital contents reproducing device 320 as a reply indicating that the application of the user is accepted together with the rental information contained in this reproduction application data via the communication line β (s34). Then, the processing of the interrupt program for piece data delivery is finished. The billing is performed in a manner similar to the foregoing.

Thereafter, upon receiving the rejection of the application of the user via the communication line β (s7), the digital contents reproducing device 320 outputs and displays an error message to the output section 322 (s8).

On the other hand, when the piece data d and the decryption key c2, and the rental information are transmitted as a replay that the application of the user is accepted from the delivery management center 310 via the communication line β (s7), the predetermined flag is hoisted, while the piece data d, the decryption key c2 and the rental information are recorded on the above-described registry for piece data on the memory section 324 (s9). At the same time, by using a clock function of the computer, a piece data transmission date and time is recorded on the memory section 324. Then, the play list is updated, and outputted and displayed on the output section 322 so as to indicate the contents file with the piece data d acquired is being rented (s1).

Thereafter, when the reproducing operation of the contents file being rented is performed based on the play list through the operation section 323 (s2), the digital contents reproducing device 320 reads out the decryption key c1 from the memory section 324, and meanwhile, it reads out the header information a of the contents file on the memory section 324 or on the recording medium and decrypts the header information a by using the relevant decryption key c1. Then, the data body b on the memory section 324 or on the recording medium is read out by using the reproduction information contained in the relevant header information a and is reproduced while being decrypted with the decryption key c2 on the memory section 324 (s10). In addition, while starting location information of the data body b on the memory section 324 or on the recording medium is read out, the piece data d on the memory section 324 is read out to start counting of a data length or a time from the starting location information to the location information contained in the piece data d (s11). Thereafter, whether or not the counting is finished is determined (s12). Thereby, the omitted part of the data body b is recognized. As a result of this determination, when it is determined that the counting is finished and the omitted part of the data body b is recognized, the piece data d on the memory section 324 is read out and the omitted data contained in the relevant piece data d is read out as the data of the omitted part of the relevant data body b and is reproduced while being decrypted with the decryption key c2 on the memory section 324 (s13). Then, the data body b on the memory section 324 or on the recording medium is read out again and is subsequently reproduced while being decrypted with the decryption key c2 on the memory section 324 (s14). This reproduction software program is finished upon end processing by the user.

Furthermore, the reproduction software, in addition to the above-described basic function, has a piece data management function which is resident in the relevant digital contents reproducing device 320 to manage the piece data d when the digital contents reproducing device 320 is turned ON. This piece data management function manages the piece data d on the memory section 324, while it obtains a difference between a piece data transmission data and time and a current date and time as an elapsed period from a time point when the piece data d is transmitted, and when this reaches the rental period contained in the rental information, it is determined to be outside of the rental period and the piece data d and the decryption key c2 on the memory section 324 are deleted and the predetermined flag is hauled down.

In the above-described illegal use preventing system 300, since the piece data d can be obtained in concurrence with the contents file, the authentic temporary use of the contents file becomes easier as compared with Embodiment 2. In addition, with respect to the contents file whose rental period has passed, the piece data d is deleted, which can also prevent secondary illegal use. Furthermore, even if the contents file is recorded on the recording medium by the user, since in this contents file recorded on this recording medium, the reproduction information contained in the header information a is omitted, the contents file cannot be reproduced unless the user obtains the piece data d as an authentic reproduction user. Therefore, tertiary, illegal use can also be prevented.

Furthermore, outside of the rental period of the digital contents, only the piece data d and the like on the memory section 324 are deleted automatically, and the contents file remains as it is. Thus, outside of the rental period, the contents file can be copied to another recording medium by using the digital contents reproducing device 320. In order to reproduce such a contents file on the recording medium, authentication to the delivery management center 310 and payment of rental fee by using the digital contents reproducing device 320 are required, so that the collection of charges in accordance with the secondary and tertiary use can be ensured.

Although the delivery management center 310 is designed to have one digital contents DB 311, it may have a plurality of digital contents DBs. In this case, the design may be such that different kinds of contents file groups are stored in the respective DBs, for example, contents files of movie are stored in a first DB and content files of music are stored in a second DB, or such that the contents file groups stored in the respective DBs are the same and the concentration of access on a first DB during busy hours is prevented. It is true of the piece data DB 316. Furthermore, although the delivery management center 310 is designed to have the digital contents DB 311 and the piece data DB 316, the digital contents DB 311 and the piece data DB 316 can also be set up in a different place from the delivery management center 310. In this case, the delivery management center 310 may authenticate the user and transmit a WEB address of the digital contents DB 311 and the piece data DB 316 to the digital contents reproducing device 320, and the digital contents reproducing device 320 may access the digital contents DB 311 and the piece data DB 316 based on the relevant WEB address to obtain the contents file and the piece data d.

Furthermore, although the digital contents DB 311 has the header information a and the data body b recorded in an encrypted state, respectively, it is arbitrary whether or not the encryption is performed. However, it is desirable that at least the data body b is encrypted.

Furthermore, while the contents file is structured to have the header information a and the data body b, it is obviously possible to record the contents file with other information added thereto. Other information includes a program by which it is determined whether or not the reproduction software has been installed in the computer of the user, and when it is determined that the reproduction software has not been installed, HP of the delivery management center 310 is automatically accessed, and the like. When this program has been recorded and the user attempts to execute the contents file which he or she has in advance obtained in his or her computer (computer equivalent to the digital contents reproducing device 320, which is in a state that the reproduction software is not downloaded), the WEB address of the delivery management center 310 is read out, and based on this, the delivery management center 310 is automatically accessed. Thereafter, the reproduction software can be obtained by the above-described procedure. Although the contents file is designed such that a part thereof is omitted, it can be obviously designed such that a plurality of points are omitted.

While the location information is designed to be a data length or a time from the starting location information to the omitted part, it may be an address value indicating the omitted part or the like. In this case, it is sequentially determined whether or not an address value of the data body b on recording medium for distribution α to be read out next and the location information coincide with each other, and when they are determined not to coincide with each other, the data body b on the memory section 324 or on the recording medium which the address value indicates is read out, while when they are determined to coincide with each other, the omitted data on the memory section 324 is read out.

While the piece data d consists of the omitted data body and the location information, whether or not the location information is contained is arbitrary. In this case, for example, omitted location information indicating the omitted part is in advance recorded before the omitted part of the data body b, and the data body b is reproduced, and further counting is performed from the starting location information to the omitted location information. When this counting is finished, the omitted data on the memory section 324 may be reproduced as the data of the relevant omitted part. Alternatively, a location of the omitted part of the data body b is predetermined, and the location information of the omitted data is prepared in the reproduction software. It is possible that the data body b is reproduced and that at the same time, the omitted part of the data body b is recognized based on this location information to reproduce the omitted data on the memory section 324 as the data of the relevant omitted part.

Thus, the contents of the reproduction software are only one example, and any modification in design can be made as long as similar contents can be realized. Furthermore, with respect to the contents of the interruption program for contents file download, any modification in design can be made as long as the contents are such that according to the application for downloading the contents file, the piece data d is downloaded together with, or separately from the contents file. It is true of the interruption program for user registration, the interruption program for reproduction software download, and the interruption program for piece data delivery.

Furthermore, in the case where the contents file is recorded on the memory section 324 of the digital contents reproducing device 320, after the rental period has passed, the contents file may be deleted together with the piece data d, or separately from the piece data d, an elapsed time from a point of time when the contents file is received is obtained and when the relevant elapsed time reaches a predetermined period, the relevant contents file may be deleted.

In the third embodiment, the system can also be changed in design so as to prevent illegal use of a contents file which is not delivered on a rental basis but transferred for pay or for free. In this case, advantages similar to the foregoing are also brought about. In the contents of the reproduction software used in this case, only the processing when the delivered contents file is outside of the rental period is deleted. Furthermore, as for the digital contents reproducing device 320, the reproduction software may not be downloaded from the delivery management center 310, but may be downloaded through a recording medium such as CD. Furthermore, obviously, the digital contents reproducing device 320 is not a computer but can be a dedicated device.

Embodiment 4

Figure 13:
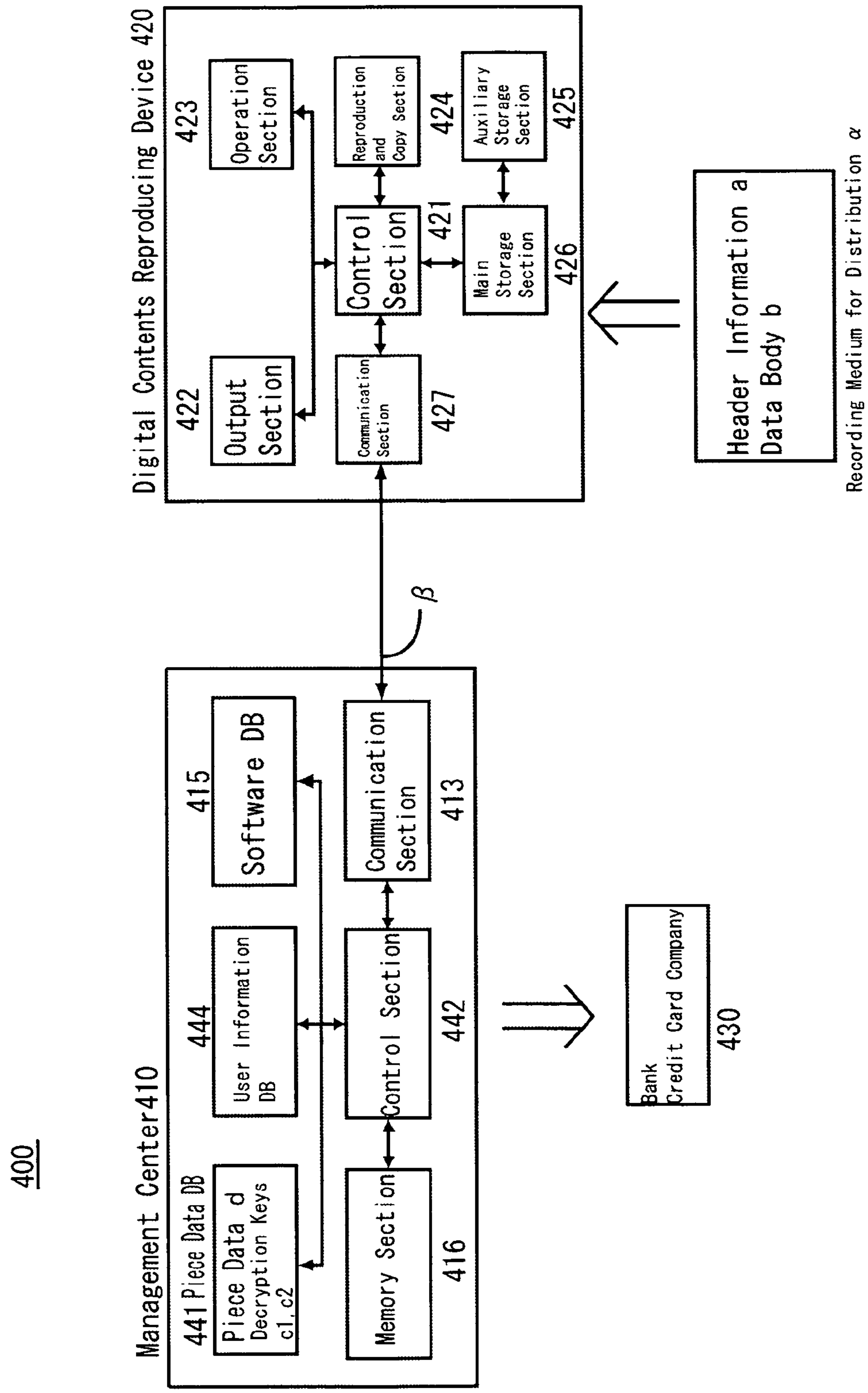
FIG. 13 is a configuration diagram of a digital contents illegal use preventing system according to a fourth embodiment of the present invention.
Figure 15:
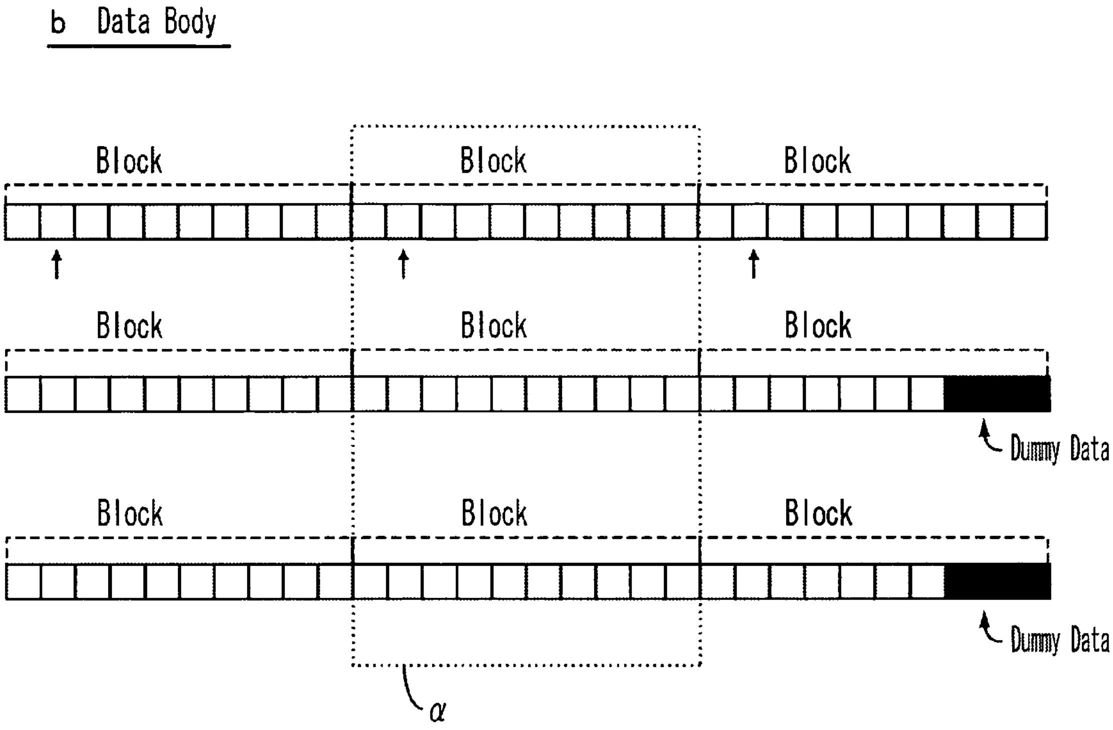
FIG. 15 is diagrams showing a contents file of this system, FIG. 15A being an image diagram of a data body and FIG. 15B being an image diagram of a part α of the data body.
Figure 15:
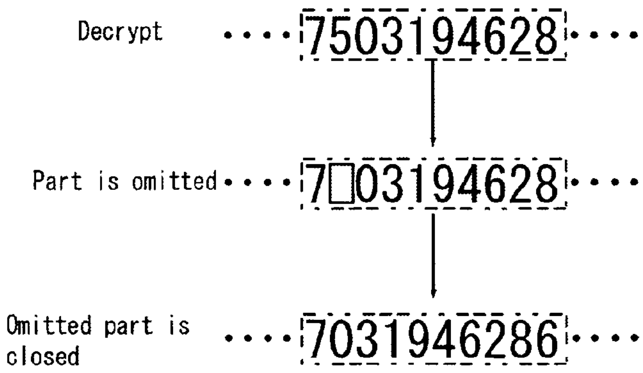
Figure 16:
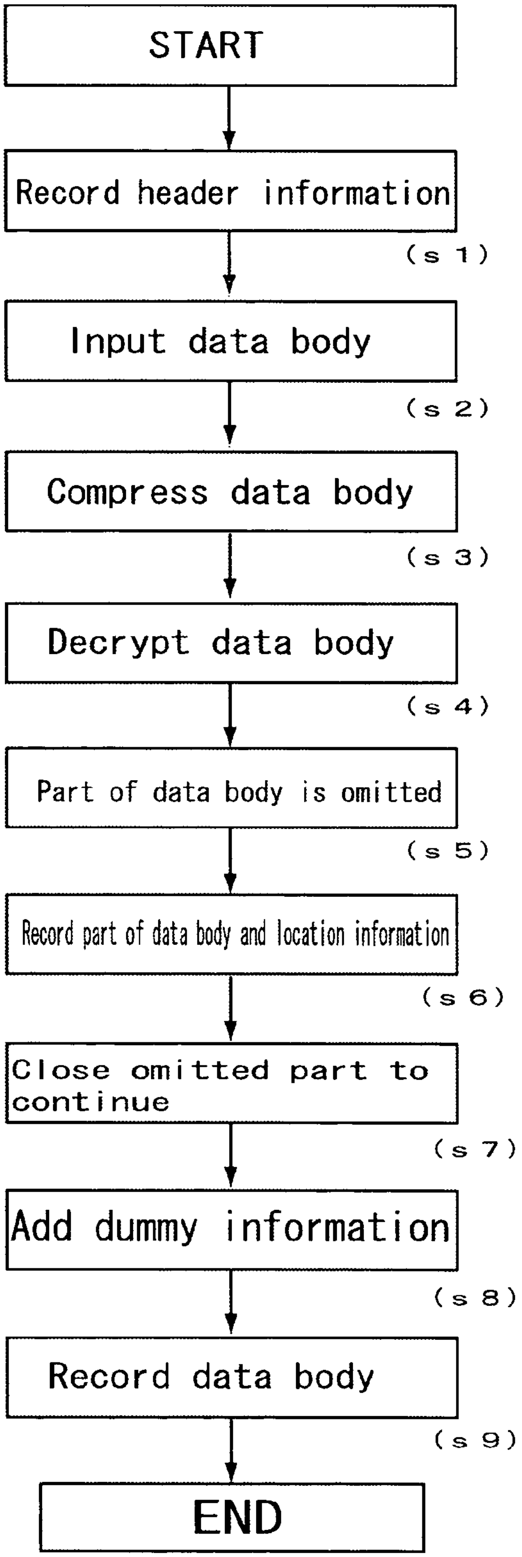
FIG. 16 is a flowchart of recording medium creating software executed by a computer which is a device for creating a recording medium for distribution used in this system.

Next, a fourth embodiment of the present invention is described with reference to the drawings. FIG. 13 is a configuration diagram of a digital contents illegal use preventing system relating to the fourth embodiment of the present invention, FIG. 14 is a flowchart of reproduction software used for this system, FIG. 15 is diagrams showing a contents file of this system, FIG. 15A being an image diagram of a data body and FIG. 15B being an image diagram of a part a of the data body, and FIG. 16 is a flowchart of recording medium creating software executed by a computer which is a device for creating a recording medium for distribution used in this system.

A digital contents illegal use preventing system 400 as shown in FIG. 13 has the same configuration as that of the illegal use preventing system 100. Different points are the configuration of the contents file recorded on the recording medium for distribution α and the contents of reproduction software recording on an auxiliary storage section 425 of a digital contents reproducing device 420 (refer to FIG. 14). Hereinafter, the different points are described in detail, and a description of overlapping parts is omitted.

The digital contents reproducing device 420 is a general-purpose computer used by a user. In the figure, reference numeral 421 denotes a control section such as CPU, reference numeral 422 denote an output section such as a monitor and a speaker, reference numeral 423 denotes an operation section such as a keyboard and a mouse, reference numeral 424 denotes a reproduction and copy section reading/writing the data with respect to the recording medium for distribution α and the like, and reference numeral 425 denotes an auxiliary storage section such as a hard disk, and reference numeral 426 denotes a main storage section such as DRAM, and reference numeral 427 denotes a communication section for performing communication which is connected to the communication line β.

Figure 14:
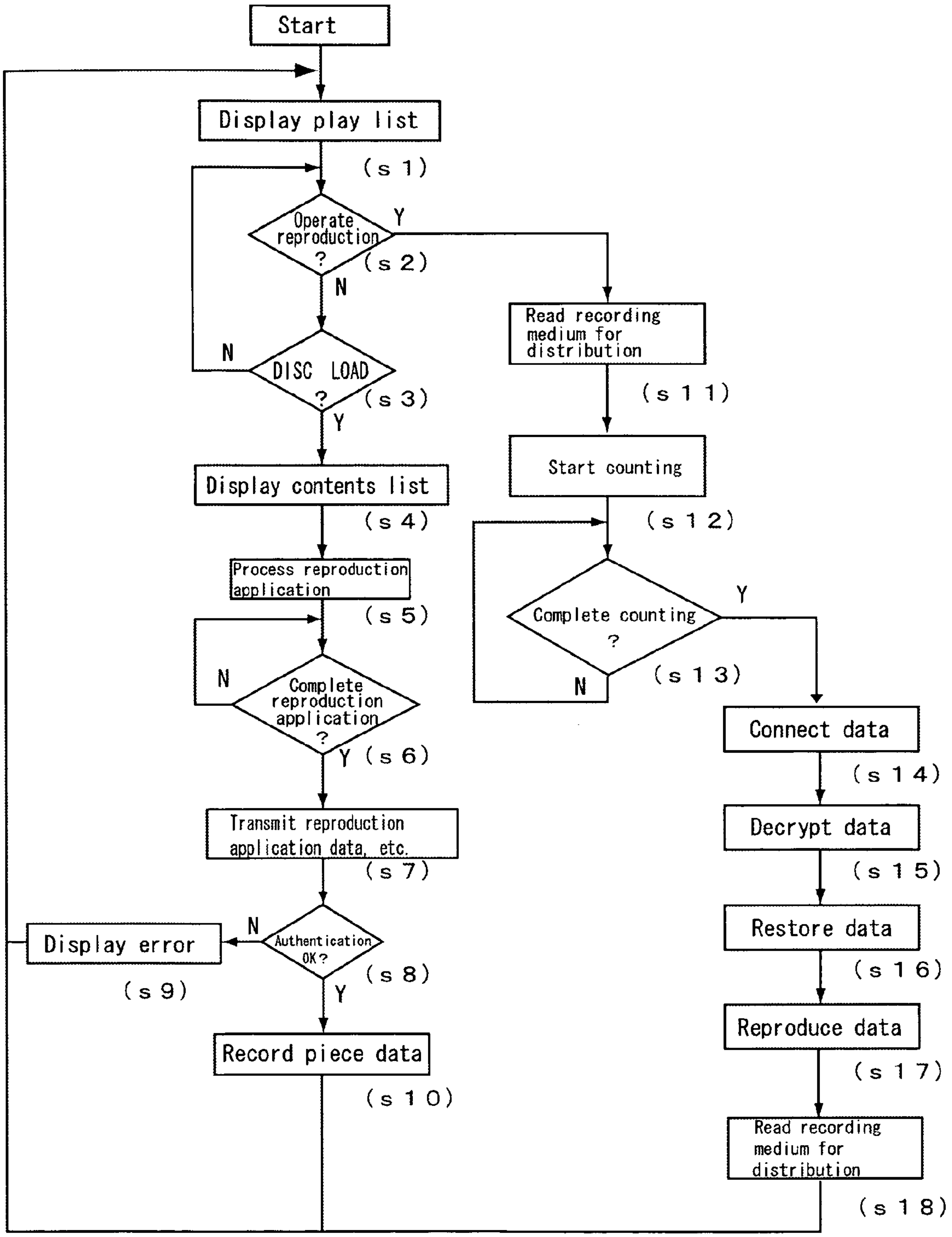
FIG. 14 is a flowchart of reproduction software used for this system.

On the auxiliary storage section 425, in addition to basic programs such as an operation system as a computer, the reproduction software as shown in FIG. 14 is recorded. The contents of the reproduction software will be described later. The processing of this software on the main storage section 426 by the control section 421 allows a function to be exerted as the digital contents reproducing device 420 in which the data body b recorded on the recording medium for distribution α is sequentially transferred to the main storage section 426 by the decryption bit length, and the relevant data on the main storage section 426 is sequentially decrypted by the decryption bit length and is returned from a compressed state to an original state for reproducing (reading).

The contents file on the recording medium for distribution a has the header information a and the data body b which is compressed in a compressing method such as MPEG and is subjected to well-known encryption, wherein part of the relevant data body b is omitted, the relevant omitted part is closed to continue the data body b, and dummy data with the same bit length as that of the omitted part is added to the end thereof (refer to FIG. 15). The control section 142 of the device for creating a recording medium for distribution 140 of Embodiment 1 processes a program on the memory 145 shown in FIG. 16 to thereby create this recording medium for distribution α. The header information a of the contents file is first read out from a master disk set in the input section 141, only reproduction information contained in the relevant header information a is encrypted and the relevant header information a is recorded on a recording medium such as DVD set in the recording section 143 (s1). Next, the data body b of the contents file is read out from the master disk (s2), is compressed (s3) and is encrypted (s4). Thereafter, part of the relevant data body b is separated (s5). In the case where a plurality of points of the data body b are separated, with the data of the decryption bit length to be transferred to the main storage section 426 defined as one block, a part is separated from the relevant one block of data (s5). Then, the relevant separated omitted data is recorded on the piece data memory 144 as the piece data d together with location information thereof (s6). Meanwhile, the omitted part of the relevant data body b is closed to continue the relevant data body b (s7) and the dummy data with the same bit length as that of the omitted part is read out from the memory section 145 to add it to the end of the relevant data body b (s8). In the case where the data body b is omitted at a plurality of points, the dummy data having a bit length of the bit length of the omitted data×the number of omitted points is added to the end of the data body b (s8). The relevant data body b is recorded on the recording medium such as DVD set in the recording section 143 (s9). This finishes the processing of this software. In the case where a plurality of points of the data body b are separated, the separation can be also performed so that the data of the decryption bit length is not of one block.

The bit length of the omitted data is a bit length different from the decryption bit length, and a bit length different from divisors of the relevant decryption bit length. In the case where the data body b is omitted at a plurality of points, the bit length of the omitted data×the number of omitted points is a bit length different from the divisors of the decryption bit length. For example, when the decryption bit length is set at 10 bytes (that is, 80 bits), the bit length of the omitted data is set at 10 bytes, and 7 bytes (that is, 56 bits) and 13 bytes (that is, 104 bits) which are bit lengths of byte numbers other than the divisors, and the like. When the bit length of the omitted data is set at 7 bytes, the data body b are not omitted at 10 and 20 points. These are because when the decryption bit length is 10 bytes, if the bit length of the omitted data is set at 20 bytes, a data row of the data of the decryption bit length after the omitted part makes no difference between before and after omitting the omitted data, and as a result, the data body b after the omitted part can be reproduced. Furthermore, when the omitted data with the bit length of 7 bytes is omitted at 10 points, a data row of the decryption bit length after the tenth omitted part of the data body b makes no difference between before and after the omitted data is omitted, and as a result, there arises a possibility that the data body b after the tenth omitted part is reproduced.

A description of a digital contents illegal use preventing method using the digital contents reproducing device 420 of the digital contents illegal use preventing system 400 configured as described above is given and in conjunction of this, the operation of a management center 410, the operation of the digital contents reproducing device 420, and the contents of the respective programs are described. The decryption keys c1, c2 are recorded on a piece data DB 441 of the management center 410. Hereinafter, for convenience, a case where one point of the data body b is omitted is described.

In the digital contents reproducing device 420, the reproduction software is downloaded by the same procedure as that of Embodiment 1 and is recorded on the auxiliary storage section 425.

When the recording medium for distribution α is set in the reproduction and copy section 424 by the user and the execution of the reproduction software is operated, this digital contents reproducing device 420 reads out the relevant reproduction software from the auxiliary storage section 425 to the main storage section 426 for processing, and reads out the data such as a reproduction player, a play list contained in the relevant reproduction software on the main storage section 426 to output and display it on the output section 422. Then, the play list showing a content file being rented is displayed on a screen of the relevant reproducing player (s1). Namely, the contents file having a predetermined flag hoisted, which indicates that a reproduction application has been made, is displayed on the play list. Then, based on this play list, whether or not reproducing operation has been performed is determined through the operation section 423 (s2).

When it is determined that the reproducing operation has not been performed, it is determined whether or not reading operation (operation of DISC LOAD) of the recording medium for distribution α has been performed through the operation section 423 (s3). When the operation of DISC LOAD is performed, a contents list showing a contents file for which reproduction application has not been made is read out on the main storage section 426 and is outputted and displayed on the output section 422 (s4). Namely, contents information contained in the header information a of the contents file with a predetermined flag not hoisted among the contents files on the recording medium for distribution α is read out on the main storage section 426 and is displayed on the contents list.

Thereafter, when an application for reproduction of the contents file on the contents list is performed by the user, the contents information contained in the header information a of the relevant contents file on the recording medium for distribution α is read out on the main storage section 426. Then, based on a WEB address contained in the relevant contents information, a contents ID contained in the relevant contents information is transmitted to the management center 410 via the communication line β. In this manner, the execution of the reproduction application is transmitted.

The management center 410 processes the interruption program for piece data delivery (take over and refer to FIG. 4). Then, the data necessary for the reproduction application processing is read out from the memory section 416 and is transmitted to the digital contents reproducing device 420 via the communication line β (s31). Based on this data, the digital contents reproducing device 420 reads out the data of a reproduction application screen on the main storage section 426 to output and display it on the output section 422 (s5).

Thereafter, when the user sequentially inputs or selects a rental period through the operation section 423 as displayed on the reproduction application screen (this determines a rental amount of money), and finally inputs a user ID and a password through the operation section 423 as a reproduction application of the recording medium for distribution α (s6), the digital contents reproducing device 420 transmits the inputted application data to the management center 410 via the communication line β. At this time, the contents ID contained in the contents information of the header information a on the recording medium for distribution α and the player ID on the auxiliary storage section 425 are read out on the main storage section 426, and transmitted to the management center 410 together with the application data (s7).

Upon receiving the relevant application data and the like, the management center 410 confirms the authentication of the user relating to the relevant application (s32). Namely, with reference to the received user ID and player ID of the user, etc., the user information of the relevant user is read out from a user information DB 414, and whether or not the relevant user is an authentic user is confirmed. At this time, the management center 410 has in advance prepared a list of in appropriate persons with nonpayments of rental fee more than or equal to predetermined times or the like in the user information DB 414, and in addition to the authentication, confirms whether or not the user falls under the list of inappropriate persons (this confirmation of the list of inappropriate persons is arbitrary).

In the case where the management center 410 has confirmed that the user relating to the application is an unauthentic user or an authentic user but a person who falls under the list of inappropriate persons, the rejection of the application of the user is transmitted to the digital contents reproducing device 420 via the communication line β (s33). Then, the interruption program for piece data delivery is finished.

On the other hand, in the case where it has been confirmed that the user relating to the application is an authentic user and a person who does not fall under the list of inappropriate persons, with reference to the player ID of the user or the like, accounting is recorded on the user information of the user on the user information DB 414, while with reference to the contents ID, a piece data DB 111 is searched to read out the decryption keys c1, c2 and the piece data d corresponding to the relevant contents ID, and to transmit them to the digital contents reproducing device 420 as a reply indicating that the application of the user is accepted together with the rental information indicating the rental period and the like which are contained in the application data via the communication line β (s34). Then, the processing of the interrupt program for piece data delivery is finished.

The accounting is summed up based on the user information DB 414 for every predetermined period, and is charged to a bank/a credit card company 430 or charged directly to the user, so that the user transfers the charge to an account or pays it in a convenience store or the like. Furthermore, in the case where the management center 410 is connected to the bank/credit card company 430 via the communication line β, it is obviously possible to immediately settle accounts, too.

Thereafter, when the digital contents reproducing device 420 receives the rejection of the application of the user via the communication line β (s8), it outputs and displays data of an error message contained in the data of the rejection on the output section 422 (s9). On the other hand, when the decryption keys c1, c2, the piece data d and the rental information are received via the communication line β (a8), the predetermined flag is set, while the decryption keys c1, c2, the piece data d and the rental information are recorded on the memory section 425 (s10). At the same time, by using a clock function of the computer, a piece data transmission date and time is recorded on the auxiliary storage section 425. Then, the play list is read out on the main storage section 426 for updating, and is outputted and displayed on the output section 422 (s1). This allows a file name of the contents file with the piece data d obtained to be displayed on the play list.

Thereafter, when the reproducing operation of the contents file is performed based on the play list through the operation section 423 (s2), the digital contents reproducing device 420 reads out the reproduction information contained in the header information a relating to the relevant contents file on the recording medium for distribution α on the main storage section 426, while it reads out the decryption key c1 from the auxiliary storage section 425 and decrypts the relevant reproduction information by using the relevant decryption key c1. Then, by using the relevant reproduction information, the data body b on the recording medium for distribution α is sequentially read out by the decryption bit length on the main storage section 426, and at the same time, the decryption key c2 is read out from the auxiliary storage section 425 on the main storage section 426. Thereby, the relevant data on the main storage section 426 is sequentially decrypted by the decryption bit length by using the decryption key c2 and the relevant data is sequentially returned from the compressed state to the original state through a filter of MPEG or the like, which reproduces the data body b (s11).

In conjunction with this processing at step 11, the starting location information of the data body b is read out from the recording medium for distribution α on the main storage section 426, while the location information contained in the piece data d is read out from the auxiliary storage section 425 on the main storage section 426, and the counting of a data length or a time from the relevant starting location information to the relevant location information is started (s12). Thereafter, whether or not the counting is finished is determined (s13). Thereby, the omitted part of the data body b is recognized. As a result of this determination, when it is determined that the counting has been finished and the omitted part of the data body b is recognized, if the bit length of the omitted data is smaller than the decryption bit length, the data body b is read out from the recording medium for distribution α and the omitted data contained in the piece data d is read out from the auxiliary storage section 425 on the main storage section 426 (namely, the data body b on the recording medium for distribution α and the omitted data on the auxiliary storage section 425 are transferred as the data of the decryption bit length) to be connected (s14). Then, the data of the decryption bit length on the relevant main storage section 426 is decrypted by using the decryption key c2 (s15) and the relevant data is returned from the compressed state to the original state through the filter of the MPEG or the like (s16), which reproduces the data body b (s17).

If the bit length of the omitted data is larger than the decryption bit length, the data body b is read out from the recording medium for distribution α and part of the omitted data contained in the piece data d is read out from the auxiliary storage section 425 on the main storage section 426 (namely, the data body b on the recording medium for distribution α and part of the omitted data on the auxiliary storage section 425 are transferred as the data of the decryption bit length) to be connected, and subsequently the remaining omitted data contained in the piece data d (data of the decryption bit length) is read out from the auxiliary storage section 425 on the main storage section 426 (s14). Then, the data on the main storage section 426 is decrypted by the decryption bit length by using the decryption key c2 (s15) and the relevant data is returned from the compressed state to the original state through the filter of the MPEG or the like (s16), which reproduces the data body b (s17).

Alternatively, part of the omitted data (data of the decryption bit length) contained in the piece data d is read out from the auxiliary storage section 425 on the main storage section 426, and subsequently, the data body b is read out from the recording medium for distribution α and the remaining omitted data contained in the piece data d is read out from the auxiliary storage section 425 on the main storage section 426 to be connected (s14). Then, the data on the main storage section 426 is decrypted by the decryption bit length by using the decryption key c2 (s15), and the relevant data is returned from the compressed state to the original state through the filter of MPEG or the like (s16), which reproduces the data body b (s17). In this manner, after the vicinity of the omitted part of the data body b is reproduced, again, the data body b on the recording medium for distribution α is read out on the main storage section 426, and is sequentially decrypted by the decryption bit length by using the decryption key c2, and the relevant data is sequentially returned from the compressed state to the original state through the filter of MPEG or the like, which reproduces the subsequent data body b (s18). In the case where the bit length of the omitted data is more than or equal to twice as large as the decryption bits, the processing at step 14 is performed continuously. This reproduction software program is finished upon end processing by the user.

Furthermore, the reproduction software, in addition to the above-described basic function, contains contents which are resident in the digital contents reproducing device 420 to manage the piece data d when the digital contents reproducing device 420 is turned ON. In this contents, the piece data d on the auxiliary memory section 425 is managed, while a difference between a piece data transmission data and time and a current date and time is obtained as an elapsed period from a time point when the piece data d is transmitted, and when this reaches the rental period contained in the rental information, it is determined to be outside of the rental period, and the piece data d and the decryption keys c1, c2 on the auxiliary storage section 425 are deleted, and the predetermined flag is hauled down.

If the decryption key c2 is stolen and an attempt to illegally reproduce the data body b of the contents file on the recording medium for distribution α by using the computer (including the digital contents reproducing device 420) without obtaining the piece data d is made, the computer is made to perform the same processing of the reproduction software as that at step 11 to thereby reproduce the data body b of the contents file on the recording medium for distribution α. At this time, when the data read out on the main storage section of the computer by the decryption bit length is data located before the omitted part, the stolen decryption key c2 which has been in advance recorded on an auxiliary storage section of another computer is read out on the main storage section, and the data on the main storage section is decrypted (namely, is subjected to a predetermined calculation) by the decryption bit length by using the decryption key c2. Then, since it is decrypted by using the stolen decryption key c2, the data on the main storage section can be sequentially converted into a data row before encryption by the decryption bit length. Consequently, after that, the data is returned from the compressed state to the original state through the filter of MPEG or the like, which can reproduce the data body b.

However, when the data read out on the main storage section of the computer is data located after the omitted part, the decryption key c2 stolen from the auxiliary storage section of another computer is read out on the main storage section, the relevant data on the main storage section is decrypted (namely, is subjected to the predetermined calculation) by the decryption bit length by using the decryption key c2. At this time, since the data row of the data on the main storage section is different from the data row after encryption (that is, the data row before omission) as shown in FIG. 15, it is converted into an unknown sequence of numbers or alphanumerics. When such unknown sequence of numbers or alphanumerics is passed through the filter of the MPEG or the like, the returning processing of the computer stops. This makes it impossible to reproduce the data of the data body b after the omitted part.

In the digital contents illegal use preventing system 400 as described above, the same effects as that of the illegal use preventing system 100 can be obtained.

In addition, in the digital contents illegal use preventing system 400, after the data body b of the contents file is compressed and encrypted, part of the relevant data body b is omitted and the data body b is recorded on the recording medium for distribution α with this omitted part closed so as to continue the data body b. Therefore, even if the decryption key c2 is stolen and thereby, the data body b is illegally reproduced by a computer or the like, when the data after omission of the data body b of the contents file on the recording medium for distribution α is read out on the main storage section of the computer by the decryption bit length and the relevant data is decrypted by the decryption bit length, the data is converted into unknown sequence of numbers or alphanumerics. When this unknown sequence of numbers or alphanumerics is passed through the filter of MPEG or the like, the returning processing stops, so that the data after the omitted part cannot be reproduced. Thus, in processing a large amount of data with equipment such as a computer, the data is read out on the main storage section of the equipment by the decryption bit length, and by making good use of the characteristic of the relevant equipment which decrypts and processes the data by the decryption bit length, the illegal reproduction of the data body b can be prevented. In addition, the data body b is recorded with the omitted part closed so as to continue the data body b. Namely, since the data body b as described above is digital data and consists of only a continuous alphanumeric sequence, when the omitted part is closed so as to continue the data body b, the location of the relevant omitted part cannot be specified. Therefore, it is also difficult to specify the location of the relevant omitted part and reproduce the data before the omitted part. Furthermore, if part of the data body b is omitted before encryption and the relevant omitted part is filled with dummy data or remains omitted, in the case where the data body b is compressed by using MPEG, the data body b other than the omitted part can be reproduced with the stolen decryption key c2. However, when part of the data body b is omitted after encryption and the omitted part is closed so as to continue the data body b, it becomes impossible to reproduce the data after the omitted part, which is very advantageous in preventing the illegal use of the data body b.

As to the recording medium for distributions α in the digital contents illegal use preventing system 400, although the data body b is compressed and encrypted, and part of the relevant data body b is omitted and the data body b is recorded with the relevant omitted part closed so as to continue the data body b, whether or not the compression is performed is arbitrary. However, in the case where the compression is not performed, the data body b after the omitted part is reproduced as only an unknown continuous sequence of numbers or alphanumerics. Although MPEG is exemplified as the compressing method, naturally, another form can be used. Furthermore, although the contents file is structured so as to have the head information a and the data body b, it is obviously possible to record it with other information added thereto. This other information includes a program by which it is determined whether or not the reproduction software has been installed in the computer of the user, and when it is determined that the software has not been installed, HP of the management center 410 is automatically accessed, and the like. When this program has been recorded and the user sets the recording medium for distribution α which he or she has in advance obtained in his or her computer (computer equivalent to the digital contents reproducing device 420, which is in a state that the reproduction software is not downloaded), the WEB address of the management center 410 is read out, and based on this, the management center 410 is automatically accessed. Thereafter, the reproduction software can be obtained by the above-described procedure.

While the location information is designed to be a data length or a time from the starting location information to the omitted part, it may be an address value indicating the omitted part or the like. In this case, it is sequentially determined whether or not an address value of the data body b on recording medium for distribution α to be read out next and the location information coincide with each other, and as a result of the determination, when they are determined not to coincide with each other, the data body b on the recording medium for distribution α which the address value indicates is read out, while when they are determined to coincide with each other, the omitted data on the memory section 425 is read out.

While the piece data d consists of the omitted data body and the location information, whether or not the location information is contained is arbitrary. In this case, for example, omitted location information indicating the omitted part is in advance recorded before the omitted part of the data body b, and the data body b is reproduced, and further counting is performed from the starting location information to the omitted location information. When this counting is finished, the omitted data on the auxiliary storage section 425 may be reproduced as the data of the relevant omitted part. Alternatively, a location of the omitted part of the data body b is predetermined, and the location information of the omitted data is prepared in the reproduction software. It is possible that the data body b is reproduced and at the same time, the omitted part of the data body b is recognized based on this location information and the omitted data on the memory section 425 is reproduced as the data of the relevant omitted part.

The interruption program for user registration, the interruption program for reproduction software download and the interruption program for piece data delivery are only one example, and can be changed in design according to need.

Furthermore, in the case where the contents file is recorded on the auxiliary storage section 425 of the digital contents reproducing device 420, after the rental period has passed, the contents file may be deleted together with the piece data d, or separately from the piece data d, an elapsed time from a point of time when the contents file is received is obtained and when the relevant elapsed time reaches a predetermined period, the relevant contents file may be deleted.

In the fourth embodiment, the system can also be changed in design so as to prevent illegal use of a contents file on the recording medium for distribution α not delivered on a rental basis but transferred to the user for pay or for free. In this case, advantages similar to the foregoing are also brought about. In the contents of the reproduction software used in this case, only the series of the processings when the delivered contents file is inside and outside of the rental period are deleted. With respect to the digital contents reproducing device, the reproduction software may not be downloaded from the management center 410, but may be installed through a recording medium such as CD. Furthermore, obviously, the digital contents reproducing device is not a computer but can be a dedicated device, and any configuration can be used as long as the digital contents reproducing device has the function in which when a reproduction application for a contents file under the condition of authentication and billing is inputted by a user, the relevant application is transmitted to the management center 410 via the communication line β and thereafter when the piece data d is transmitted from the management center 410 via the communication line β, the data body b on the recording medium for distribution α is reproduced by using the header information on the recording medium for distribution α and the relevant piece data d at the time of reproducing operation.

Embodiment 5

Figure 17:
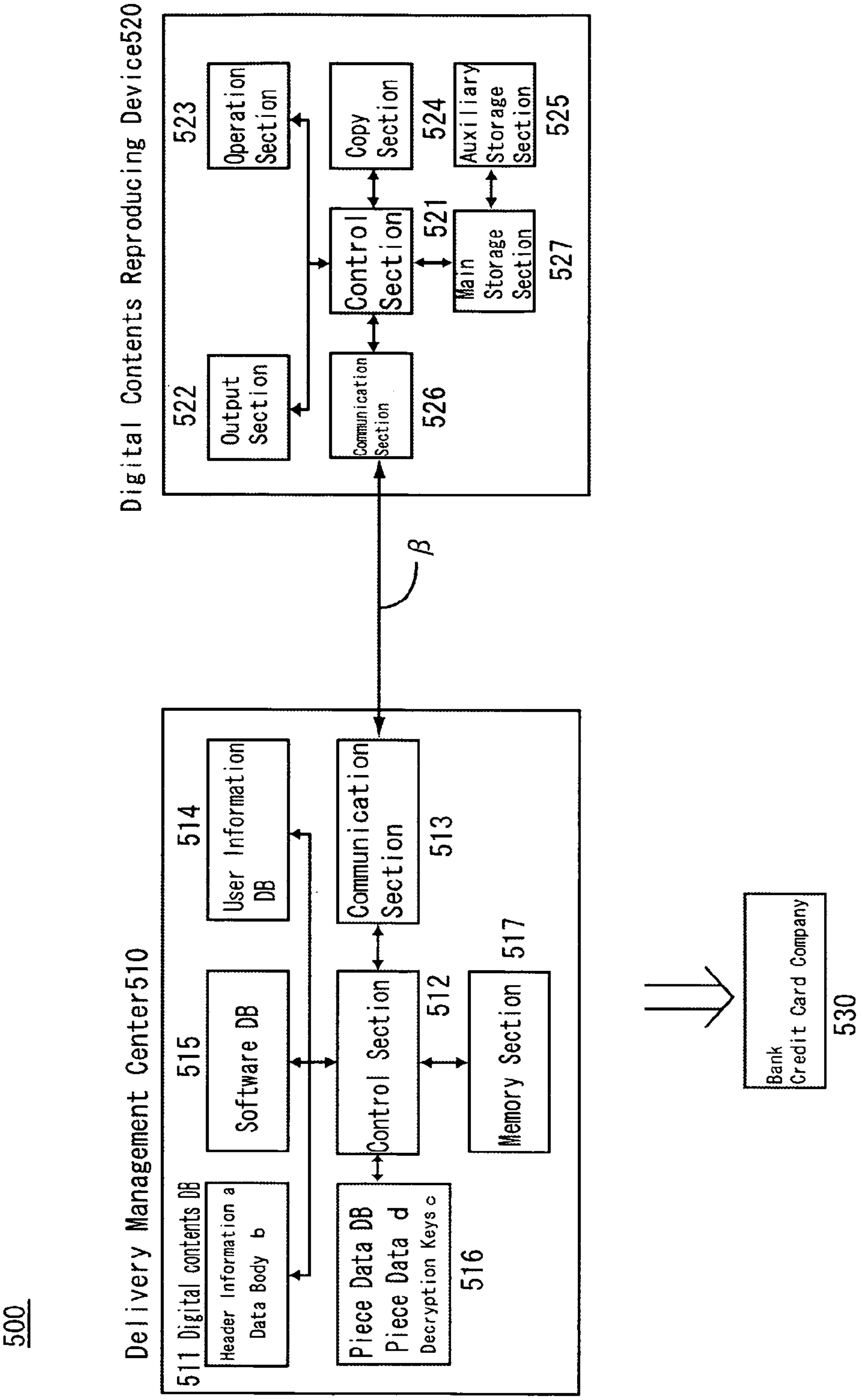
FIG. 17 is a configuration diagram of a digital contents illegal use preventing system according to a fifth embodiment of the present invention.
Figure 18:
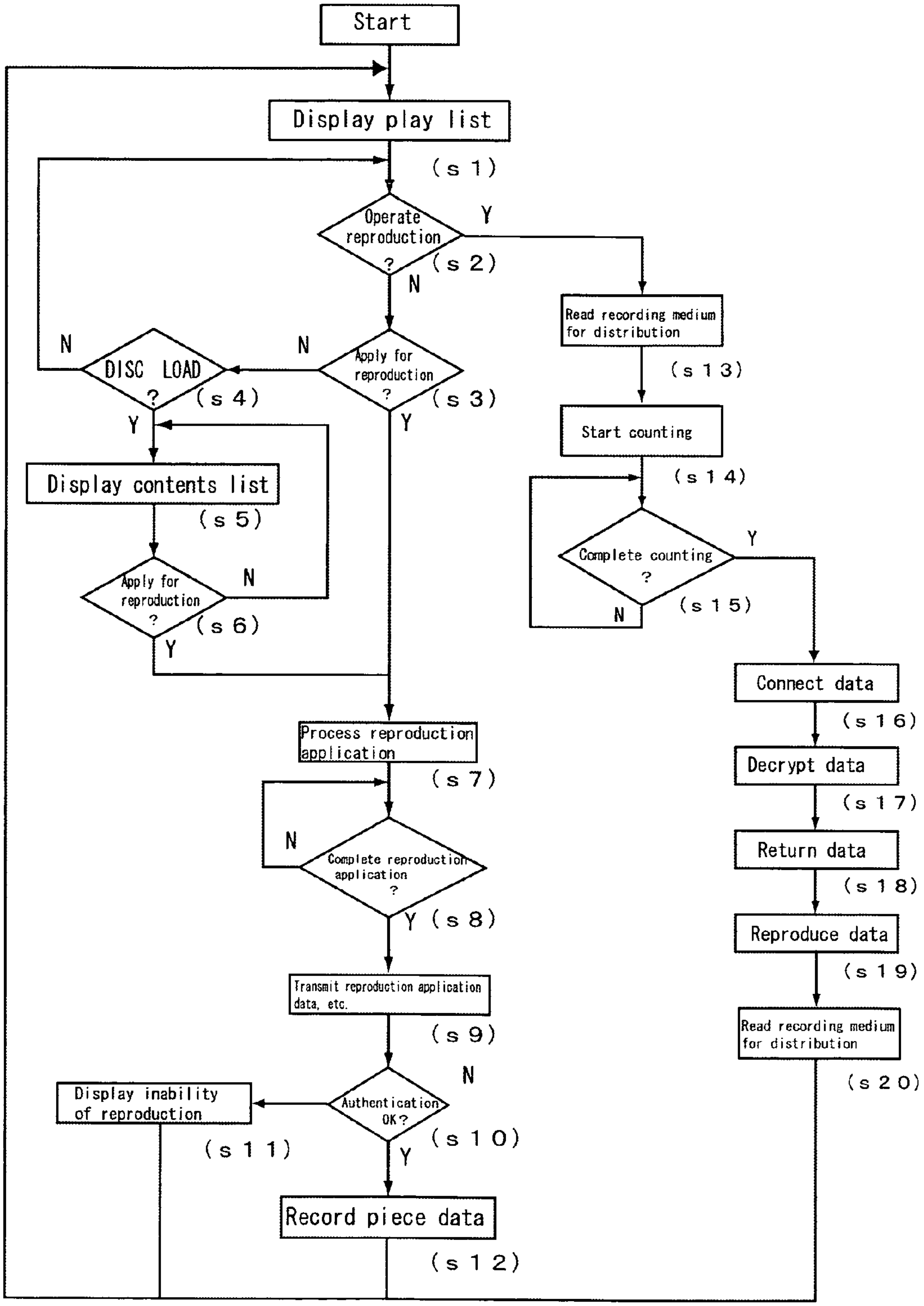
FIG. 18 is a flowchart of reproduction software used for this system.

Next, a fifth embodiment of the present invention is described with reference to the drawings. FIG. 17 is a configuration diagram of a digital contents illegal use preventing system relating to the fifth embodiment of the present invention, and FIG. 18 is a flowchart of reproduction software used for this system.

A digital contents illegal use preventing system 500 as shown in FIG. 17 has the same configuration as that of the illegal use preventing system 200. Different points are the configuration of the contents file and the contents of reproducing software recording on an auxiliary storage section 525 of a digital contents reproducing device 520 (refer to FIG. 18). Hereinafter, the different points are described in detail, and a description of overlapping parts is omitted.

In the contents file, similar to Embodiment 4, the header information a is recorded on a recording medium in a state that reproduction information contained in the relevant header information a is encrypted, while the data body b is compressed in a compressing method such as MPEG and is encrypted, and part of the relevant data body b is omitted, the relevant omitted part is closed so as to continue the data body b, and is recorded on a newly provided data body memory section (not shown) in a state that dummy data of the same bit length as the omitted part is added to the end thereof. Thereafter, the data body b on the data body memory section of the device for creating a recording medium for distribution 140 is transferred to a delivery management center 510 via the communication line β and is recorded on a digital contents DB 511 (auxiliary storage device) of the delivery management center 510 (electronic equipment). The data body b may be recorded on a recording medium and be sent to the delivery management center 510 by mail to be read and thereby recorded on the digital contents DB 511.

The digital contents reproducing device 520 is a general-purpose computer used by a user. In the figure, reference numeral 521 denotes a control section such as CPU, reference numeral 522 denotes an output section such as a monitor and a speaker, reference numeral 523 denotes an operation section such as a keyboard and a mouse, reference numeral 524 denotes a reproduction and copy section reading/writing the data with respect to the recording medium and the like, reference numeral 525 denotes an auxiliary storage section such as a hard disk, reference numeral 526 denotes a communication section for performing communication which is connected to the communication line β, and reference numeral 527 denotes a main storage section such as DRAM.

On the auxiliary storage section 525, in addition to basic programs such as an operation system as a computer, the reproduction software as shown in FIG. 18 is recorded. The contents of the reproduction software will be described later. The processing of the relevant reproduction software on the main storage section 527 by the control section 521 allows a function to be exerted as the digital contents reproducing device 520 in which the data body b recorded on the auxiliary storage section 525 or the recording medium is sequentially transferred to the main storage section 527 by the decryption bit length, the relevant data on the main storage section 527 is sequentially decrypted by the decryption bit length (that is, decrypted by the decryption bit length), and the relevant data is returned from a compressed state to an original state for reproduction (reading).

A description of a digital contents illegal use preventing method using the digital contents reproducing device 520 of the digital contents illegal use preventing system 500 configured as described above is given, and in conjunction of this, the operation of the delivery management center 510, the operation of the digital contents reproducing device 520, and the contents of respective programs are described. The decryption keys c1, c2 are recorded on a piece data DB 516 of the delivery management center 510. Hereinafter, for convenience, a case where one point of the data body b is omitted is described.

In the digital contents reproducing device 520, the reproduction software is downloaded by the same procedure as that of Embodiment 2 and is recorded on the auxiliary storage section 525. Then, by the same procedure as that of Embodiment 2, the contents file is downloaded from the digital contents DB 511 of the delivery management center 510 and is recorded on the auxiliary storage section 525 of the digital contents reproducing device 520 or on the recording medium.

Thereafter, when the reproduction software is executed by the user (in the case where the contents file is recorded on the recording medium, the reproduction software is executed and meanwhile, the relevant recording medium is set in a reproduction and copy section 524), this digital contents reproducing device 520 outputs and displays the data such as a reproduction player and a play list contained in the relevant reproduction software on the output section 522. Then, the play list is displayed on a screen of the relevant reproducing player (s1). On this play list, together with a file name of the downloaded contents file, whether or not the relevant contents file is being rented is indicated. Namely, the contents file having a predetermined flag hoisted, which indicates that a reproduction application has been made, is displayed. Then, based on this play list, whether or not reproducing operation has been performed for the contents file being rented is determined through the operation section 523 (s2).

If it is determined that the reproducing operation has not been performed, then it is determined whether or not reproduction application operation of the contents file not being rented which is displayed on the play list has been performed through the operation section 523 (s3). As a result, if the reproduction application operation has not been performed, then it is determined whether or not reading operation (operation of DISC LOAD) of the recording medium has been performed through the operation section 523 (s4). When the operation of DISC LOAD is performed, a contents list showing a contents file on the recording medium which is not recorded on the play list (that is, downloaded on the recording medium with another computer or the like) is outputted and displayed on the output section 522 (s5). Namely, contents information contained in the header information a of the contents file with a predetermined flag not hoisted among the contents files on the recording medium is read out on the main storage section 527 and is displayed on the contents list.

Thereafter, when an application for reproduction of the contents file not being rented on the play list or the contents file on the contents list is performed by the user (s3 or s6), the contents information contained in the header information a of the relevant contents file on the auxiliary storage section 525 or the recording medium is read out on the main storage section 527. Then, based on a WEB address contained in the relevant contents information, a contents ID contained in the relevant contents information is transmitted to the delivery management center 510 via the communication line β. In this manner, the execution of the reproduction application is transmitted.

The management center 510 processes the interruption program for piece data delivery (refer to FIG. 9). Then, the data necessary for the reproduction application processing is read out from the memory section 516 and is transmitted to the digital contents reproducing device 520 via the communication line β (s31). Based on this data, the digital contents reproducing device 520 reads out the data of a reproduction application screen on the main storage section 426 to output and display it on the output section 522 (s7).

Thereafter, when the user sequentially inputs or selects a rental period through the operation section 523 as displayed on the reproduction application screen (this determines a rental amount of money), and finally inputs a user ID and a password through the operation section 523 as a reproduction application of the contents file (s8), the digital contents reproducing device 520 shifts the display output to an authentication screen, and meanwhile, transmits the inputted application data to the delivery management center 510 via the communication line β. At this time, the contents ID of the contents information on the auxiliary storage section 525 or on the recording medium and the player ID on the relevant auxiliary storage section 525 are read out and transmitted to the delivery management center 510 together with the application data (s9).

Upon receiving the relevant application data or the like, the delivery management center 510 confirms the authentication of the user relating to the relevant application (s32). Namely, with reference to the received user ID and player ID of the user, etc., the user information of the relevant user is read out from a user information DB 514, and whether or not the relevant user is an authentic user is confirmed. At this time, the delivery management center 510 has in advance prepared a list of inappropriate persons with nonpayments of rental fee more than or equal to predetermined times or the like in the user information DB 514, and in addition to the authentication, confirms whether or not the user falls under the list of inappropriate persons (this confirmation of the list of inappropriate persons is arbitrary).

In the case where the delivery management center 510 has confirmed that the user relating to the application is an unauthentic user or an authentic user but a person who falls under the list of inappropriate persons, the rejection of the application of the user is rejected is transmitted to the digital contents reproducing device 520 via the communication line β (s33). Then, the interruption program for piece data delivery is finished.

On the other hand, in the case where it has been confirmed that the user relating to the application is an authentic user and a person who does not fall under the list of inappropriate persons, with reference to the player ID of the user or the like, accounting is recorded on the user information of the user on the user information DB 514, while with reference to the contents ID, the piece data DB 516 is searched to read out the piece data d and the decryption keys c1, c2 corresponding to the relevant contents ID and to transmit them to the digital contents reproducing device 520 as a reply indicating that the application of the user is accepted together with the rental information indicating the rental period and the like which are contained in the application data via the communication line β (s34). Then, the processing of the interrupt program for piece data delivery is finished.

The accounting is charged to a bank/credit card company 530 or charged directly to the user, based on the user information DB 514 for every predetermined period and the user transfers the charge to an account or pays it in a convenience store or the like. Furthermore, in the case where the delivery management center 510 is connected to the bank/credit card company 530 via the communication line β, it is obviously possible to immediately settle accounts, too.

Thereafter, when the digital contents reproducing device 520 receives the rejection of the application of the user via the communication line β (s10), it outputs and displays data of an error message contained in the data of the rejection on the output section 522 (s11).

On the other hand, when the piece data d, decryption keys c1, c2 and the rental information are received via the communication line β (s10), the predetermined flag is hoisted, while the piece data d, the decryption keys c1, c2 and the rental information are recorded on the auxiliary storage section 525 (s12). At the same time, by using a clock function of the computer, a piece data transmission date and time is recorded on the auxiliary storage section 525. Then, the play list is updated and is outputted and displayed on the output section 522, which allows a file name of the contents file with the piece data d obtained to be displayed on the relevant play list (s1).

Thereafter, when the reproducing operation of the contents file being rented is performed based on the play list through the operation section 523 (s2), the digital contents reproducing device 520 reads out on the main storage section 527 the reproduction information contained in the header information a of the contents file on the auxiliary storage section 525 or on the recording medium, while it reads out the decryption key c1 from the auxiliary storage section 525 on the main storage section 527. Then, by using the relevant reproduction information, the data body b on the auxiliary storage section 525 or on the recording medium is sequentially read out by the decryption bit length on the main storage section 527 and meanwhile, the decryption key c2 is read out from the auxiliary storage section 525 on the main storage section 527. In addition, the relevant data on the main storage section 527 is decrypted by the decryption bit length by using the decryption key c2, and is returned from the compressed state to the original state through a filter of MPEG or the like, which reproduces the data body b (s13).

Therewith, the starting location information of the data body b on the auxiliary storage section 525 or the recording medium is read out on the main storage section 527, while the starting location information contained in the piece data d on the auxiliary storage section 525 is read out on the main storage section 527, and the counting of a data length or a time from the starting location information to the location information is started (s14). Thereafter, whether or not the counting is finished is determined (s15). Thereby, the omitted part of the data body b is recognized. As a result of this determination, when it is determined that the counting has been finished and the omitted part of the data body b is recognized, if the bit length of the omitted data is smaller than the decryption bit length, the data body b is read out from the auxiliary storage section 525 or the recording medium and the omitted data contained in the piece data d is read out from the auxiliary storage section 525 on the main storage section 527 (namely, the data body b on the recording medium or the auxiliary storage section 525 and the omitted data on the auxiliary storage section 525 are transferred as the data of the decryption bit length) to be connected (s16). Then, the data of the decryption bit length on the main storage section 527 is decrypted by using the decryption key c2 (s17) and the relevant data is returned from the compressed state to the original state through the filter of the MPEG or the like (s18), which reproduces the data body b (s19).

If the bit length of the omitted data is larger than the decryption bit length, the data body b is read out from the auxiliary storage section 525 or the recording medium and part of the omitted data contained in the piece data d is read out from the auxiliary storage section 525 on the main storage section 527 (namely, the data body b on the recording medium for distribution α and part of the omitted data on the auxiliary storage section 525 are transferred as the data of the decryption bit length) to be connected, and subsequently the remaining omitted data contained in the piece data d (data of the decryption bit length) is read out from the auxiliary storage section 525 on the main storage section 527 (s16). Then, the data on the main storage section 527 is decrypted by the decryption bit length by using the decryption key c2 (s17) and the relevant data is returned from the compressed state to the original state through the filter of the MPEG or the like (s18), which reproduces the data body b (s19).

Alternatively, part of the omitted data (data of the decryption bit length) contained in the piece data d is read out from the auxiliary storage section 525 on the main storage section 527, and subsequently, the data body b is read out from the auxiliary storage section 525 or the recording medium and the remaining omitted data contained in the piece data d is read out from the auxiliary storage section 525 on the main storage section 527 to be connected (s16). Then, the data on the main storage section 527 is decrypted by the decryption bit length by using the decryption key c2 (s17), and the relevant data is returned from the compressed state to the original state through the filter of MPEG or the like (s18), which reproduces the data body b (s19). In this manner, after the vicinity of the omitted part of the data body b is reproduced, again, the data body b on the auxiliary storage section 525 or the recording medium is read out on the main storage section 527, and is sequentially decrypted by the decryption bit length by using the decryption key c2, and the relevant data is sequentially returned from the compressed state to the original state through the filter of MPEG or the like, which reproduces the subsequent data body b (s20). In the case where the bit length of the omitted data is more than or equal to twice as large as the decryption bits, the processing at step 16 is performed continuously. This reproduction software program is finished upon end processing by the user.

Furthermore, in addition to the above-described basic function, to the reproduction software, there are added contents which are resident in the digital contents reproducing device 520 to manage the piece data d when the digital contents reproducing device 520 is turned ON. In this contents, the piece data d on the auxiliary storage section 525 is managed, while a difference between a piece data transmission data and time and a current date and time is obtained as an elapsed period from a time point when the piece data d is transmitted, and when this reaches the rental period contained in the rental information, it is determined to be outside of the rental period, and the piece data d and the decryption keys c1, c2 on the auxiliary storage section 525 are deleted, while the predetermined flag is hauled down.

If the decryption key c2 is stolen and an attempt to illegally reproduce the data body b of the contents file recorded on the auxiliary storage section of the relevant computer or the recording medium by using the computer (including the digital contents reproducing device 520) without obtaining the piece data d is made, the computer is made to perform the same processing of the reproduction software as that at step 13 to thereby reproduce the data body b of the contents file on the auxiliary storage section or on the recording medium. At this time, when the data read out on the main storage section of the computer by the decryption bit length is data located before the omitted part, the stolen decryption key c2 which has been in advance recorded on an auxiliary storage section of another computer is read out on the main storage section, and the data on the main storage section is decrypted (namely, is subjected to a predetermined calculation) by the decryption bit length by using the decryption key c2. Then, since it is decrypted by using decryption key c2, the data can be converted into a data row before encryption. Consequently, after that, the data is returned from the compressed state to the original state through the filter of MPEG or the like, which can reproduce the data body b.

However, when the data read out on the main storage section of the computer by the decryption bit length is data located after the omitted part, the decryption key c2 stolen from the auxiliary storage section of another computer is read out on the main storage section, the relevant data on the main storage section is decrypted (namely, is subjected to the predetermined calculation) by the decryption bit length by using the decryption key c2. At this time, since the data row of the data on the main storage section is different from the data row after encryption (that is, the data row before omission) (take over and refer to FIG. 15), it is converted into an unknown sequence of numbers or alphanumerics. When these unknown sequence of numbers or alphanumerics is passed through the filter of the MPEG or the like, the returning processing of the above-mentioned another computer stops. This makes it impossible to reproduce the data of the data body b after the omitted part.

In the digital contents illegal use preventing system 500 as described above, the same effects as that of the illegal use preventing system 200 can be obtained.

In addition, in the digital contents illegal use preventing system 500, after the data body b of the contents file is compressed and decrypted, part of the relevant data body b is omitted and the data body b is recorded on the auxiliary storage section or on the recording medium with this omitted part closed so as to continue the data body b. Therefore, even if the decryption key c2 is stolen and thereby, the data body b is illegally reproduced by a computer or the like, when the data after omission of the data body b of the contents file on the auxiliary storage section or on the recording medium is read out on the main storage section of the computer by the decryption bit length and is decrypted by the decryption bit length, the data is converted into unknown sequence of numbers or alphanumerics. When this unknown sequence of numbers or alphanumerics is passed through the filter of MPEG or the like, the returning processing stops, so that the data after the omitted part cannot be reproduced. Thus, in processing a large amount of data with equipment such as a computer, by making good use of the characteristic of the relevant equipment in which the data is read out on the main storage section of the equipment by the decryption bit length to be processed, the illegal reproduction of the data body b can be prevented. In addition, the data body b is recorded with the omitted part closed so as to continue the data body b. Namely, since the data body b as described above is digital data and consists of only a continuous alphanumeric sequence, when the omitted part is closed so as to continue the data body b, the location of the relevant omitted part cannot be specified. Therefore, it is also difficult to specify the location of the omitted part and reproduce the data before the omitted part. Furthermore, if part of the data body b is omitted before encryption and the omitted part is filled with dummy data or remains omitted, in the case where the data body b is compressed by using MPEG, the data body b other than the omitted part can be reproduced with the stolen decryption key c2. However, when part of the data body b is omitted after encryption and the omitted part is closed so as to continue the data body b, it becomes impossible to reproduce the data after omitted part, which is very advantageous in preventing the illegal use of the data body b.

Although the data body b is compressed and encrypted in the digital contents DB 511, and part of the relevant data body b is omitted and the data body b is recorded with the relevant omitted part closed so as to continue the data body, whether or not the compression is performed is arbitrary. However, in the case where the compression is not performed, the data body b after the omitted part is reproduced as only an unknown continuous sequence of numbers or alphanumerics. Although MPEG is exemplified as the compressing method, naturally, another form can be used. Furthermore, although the contents file is structured so as to have the head information a and the data body b, it is obviously possible to record it with other information added thereto. This other information includes a program by which it is determined whether or not the reproduction software has been installed in the computer of the user, and when it is determined that the software has not been installed, HP of the delivery management center 510 is automatically accessed, and the like. When this program has been recorded and the user attempts to execute the contents file which he or she has in advance obtained in his or her computer (computer equivalent to the digital contents reproducing device 520, which is in a state that the reproduction software is not downloaded), the WEB address of the delivery management center 510 is read out, and based on this, the management center 510 is automatically accessed. Thereafter, the reproduction software can be obtained by the above-described procedure.

While the location information is designed to be a data length or a time from the starting location information to the omitted part, it may be an address value indicating the omitted part or the like. In this case, it is sequentially determined whether or not an address value of the data body b on recording medium for distribution α to be read out next and the location information coincide with each other, and as a result of the determination, when they are determined not to coincide with each other, the data body b on the auxiliary storage section or on the recording medium which the address value indicates is read out, while when they are determined to coincide with each other, the omitted data on the auxiliary storage section 525 is read out.

While the piece data d consists of the omitted data body and the location information, whether or not the location information is contained is arbitrary. In this case, for example, omitted location information indicating the omitted part is in advance recorded before the omitted part of the data body b, and the data body b is reproduced, and further counting is performed from the starting location information to the omitted location information. When this counting is finished, the omitted data on the auxiliary storage section 525 may be reproduced as the data of the relevant omitted part. Alternatively, a location of the omitted part of the data body b is predetermined, and the location information of the omitted data is prepared in the reproduction software. It is possible that the data body b is reproduced and at the same time, the omitted part of the data body b is recognized based on this location information and the omitted data on the auxiliary storage section 525 is reproduced as the data of the relevant omitted part.

The interruption program for user registration, the interruption program for reproduction software download and the interruption program for pieced at a delivery are only one example, and can be changed in design according to need.

It goes without saying that this data illegal use preventing method and the programs can be applied to the digital contents reproducing device 320 of Embodiment 3.

Furthermore, in the case where the contents file is recorded on the auxiliary storage section 525 of the digital contents reproducing device 520, after the rental period has passed, the contents file may be deleted together with the piece data d, or separately from the piece data d, an elapsed time from a point of time when the contents file is received is obtained and when the relevant elapsed time reaches a predetermined period, the relevant contents file may be deleted.

In the fifth embodiment, the system can also be changed in design so as to prevent illegal use of a contents file not delivered on a rental basis but transferred for pay or for free. In this case, advantages similar to the foregoing are also brought about. In the contents of the reproduction software used in this case, only the processing when the delivered contents file is outside of the rental period is deleted. With respect to the digital contents reproducing device 520, the reproduction software may not be downloaded from the delivery management center 510, but may be installed through a recording medium such as CD. Furthermore, obviously, the digital contents reproducing device is not a computer but can be a dedicated device.

In the above-described embodiments, although the method for processing the data body b of the digital contents is described, in the processing method of the data which is encrypted and decrypted by the decryption bit length, thereby being read, any data can be processed as long as the data is encrypted, part of a bit length different from the decryption bit length of this data is omitted, and the omitted part is closed to continue the relevant data. With respect to the equipment for processing the data, any equipment may be used as long as it can realize a function similar to that of the device for creating a recording medium for distribution 140. For example, the above-mentioned method can be used for a data reading device which is a computer to process the data.

Furthermore, this data processing method is available as a method for preventing the illegal use of transmitted and received data. In this case, a digital contents reproducing device only needs to be a data reading device which can read the data, a management center and a delivery management center only needs to be electronic equipment which is connected to the data reading device via a communication line, and has an auxiliary storage device recording the omitted data. The electronic equipment is a concept including a data reading device. Specifically, in transmitting the data recorded on the auxiliary storage section of the data reading device, the data is encrypted, at least part of the relevant data is omitted, and the relevant omitted part is closed to continue the data, and the relevant data is recorded on the auxiliary storage section of the data reading device, while the omitted data is recorded on the auxiliary storage section together with location information indicating in which part of the data the relevant omitted part is located. Thereafter, the data reading device is made to transmit the data on the auxiliary storage section to the electronic equipment, while the omitted data, the location information and a decryption key are transmitted to the above-mentioned other data reading device separately from the data. This enables the data to securely be transmitted to the other data reading device. If the data and the encryption key are stolen, reading is disabled unless the omitted data and the location information are obtained, which can prevent the illegal use of the data. It goes without saying that the omitted data and location information are desirably transmitted separately from the decryption key.

The invention claimed is:

1. A method for reading data using a data reading device for reading omitted data associated with a recording medium, the method comprising:

pre-recording the omitted data and location information indicating in which part of the data the omitted data is located within an electronic equipment having an auxiliary storage device;

connecting the data reading device to the electronic equipment accessing the omitted data with a communication line;

enabling the data reading device to send a request to the electronic equipment via the communication line for the omitted data relating to the data to read and its location information in accordance with operation inputs, and the electronic equipment transmits the omitted data and its location information in reply to the request;

enabling the data reading device to receive the omitted data and its location information;

transferring to a main storage section on the data reading device the location information on the auxiliary storage section, with reference to the location information, the omitted part of said data is recognized, and the omitted data on the auxiliary storage section is transferred to the main storage section; and transferring the data on the recording medium to the main storage section.

2. The method of claim 1 further comprising the step of compressing said omitted data before encryption.

3. The method of claim 2, further comprising the step of, after closing the omitted part so as to make the data continuous, adding dummy data having the same bit length as that of the omitted data at the end of the data.

4. The method of claim 3, in which the data which is omitted has a plurality of omitted data parts, wherein a product of the bit length of the omitted data and the number of omissions is a bit length different from the divisor of the decryption bit length.

5. The method of claim 1 further comprising the step of, after closing the omitted part so as to make the data continuous, adding dummy data having the same bit length as that of the omitted data at the end of the data.

6. The method of claim 1 wherein the bit length of the omitted data is a bit length different from a divisor of the decryption bit length.

7. The method of claim 1, in which the omitted data has a plurality of omitted data parts, wherein a product of the bit length of the omitted data and the number of omissions is a bit length different from the divisor of the decryption bit length.

8. The method for reading data according to claim 1, wherein said electronic equipment is a management means for managing the use of the data by the transmission of the omitted data and its location information.

9. The method for reading data according to claim 1, wherein the data recorded on the recording medium is recorded in advance on another auxiliary storage device, and is transmitted from the electronic equipment in reply to the request by the data reading device to the electronic equipment via the communication line, and is recorded on the recording medium.

10. The method for reading data according to claim 1, wherein the data reading device obtains an elapsed time from a point of time when the omitted data is received, and when the elapsed time reaches a predetermined period, the data reading device deletes at least the omitted data on the auxiliary storage section.

11. The method for reading data according to claim 10, wherein the data reading device obtains an elapsed time from a point of time when the data is received, separately from the omitted data, and when the relevant elapsed time reaches a predetermined period, the data reading device deletes the data on the auxiliary storage section.

12. A non-transitory computer readable recording medium wherein programs implementing the method for processing data according to claim 1 are recorded.

13. A digital contents illegal use prevention system for distributing a content file, comprising:

a recording medium distribution device configured to receive the content file, wherein the content file includes, a header, a data body comprising, a remaining content file and a piece data file that includes an omitted data file;

a recording medium that receives the header and the remaining content file associated with the data body;

a management center having a database that receives the piece data that includes the omitted data file, the management center configured to identify an authentic user;

a digital contents reproduction device that is configured to reproduce the content file, wherein the digital contents reproduction device includes a reproduction software module configured to read the recording medium for distribution; and a communications line configured to support communications between the management center and the digital contents reproduction device, wherein the management center is configured to communicate the piece data to the digital contents reproduction device after the identity of the authentic user has been confirmed.

14. The digital contents illegal use prevention system of claim 13 wherein the piece data file further comprises a location for the omitted data and the management center database is configured to store the location of the omitted data.

15. The digital contents illegal use prevention system of claim 14 wherein the digital contents reproduction device is a general purpose computer.

16. The digital contents illegal use prevention system of claim 15 wherein the reproduction software module is downloaded from the management center.

17. The digital content illegal use prevention system of claim 16 wherein the data body is encrypted.

18. The digital content illegal use prevention system of claim 17 wherein the management center is further configured to collect a charge from a user.

19. The digital content illegal use prevention system of claim 18 wherein the management center is further configured to send information indicating a rental period to the digital contents reproduction device.

20. The digital content illegal use prevention system of claim 19 wherein the management center is further configured to transmit to the digital contents reproduction device a rejection of an application of a user if the user is not confirmed as an authentic user.

* * * * *